US006709023B2

(12) United States Patent
French

(10) Patent No.: US 6,709,023 B2
(45) Date of Patent: Mar. 23, 2004

(54) FLEXIBLE SLIDE JOINT

(75) Inventor: Hugh N. French, Silver Spring, MD (US)

(73) Assignee: PerkinElmer Inc., Wellesley, MA (US)

( * ) Notice: Subject to any disclaimer, the term of this patent is extended or adjusted under 35 U.S.C. 154(b) by 120 days.

(21) Appl. No.: 10/042,289

(22) Filed: Jan. 11, 2002

(65) Prior Publication Data

US 2003/0132630 A1 Jul. 17, 2003

(51) Int. Cl.[7] ................................. F16L 27/06
(52) U.S. Cl. .................. 285/223; 285/224; 285/226; 285/299; 285/300; 285/301; 285/233
(58) Field of Search ................ 285/299, 300, 285/301, 261, 224, 223, 233

(56) References Cited

U.S. PATENT DOCUMENTS

| 4,054,306 A | 10/1977 | Sadoff, Jr. et al. |
| 4,071,268 A | 1/1978 | Halling et al. |
| 4,071,269 A | 1/1978 | Halling et al. |
| 4,553,775 A | 11/1985 | Halling |
| 4,643,463 A | 2/1987 | Halling et al. |
| 4,776,617 A | 10/1988 | Sato |
| 4,779,901 A | 10/1988 | Halling |
| 5,069,487 A | * 12/1991 | Sheppard .................. 285/226 |
| 5,433,370 A | 7/1995 | Halling |
| 5,505,498 A | 4/1996 | Halling et al. |
| 5,611,577 A | 3/1997 | Meyer et al. |
| 5,740,839 A | 4/1998 | Kuo et al. |
| 5,772,254 A | 6/1998 | Felber et al. |
| 6,109,661 A | 8/2000 | Cwik et al. |
| 6,464,258 B2 | 10/2002 | Shin |

FOREIGN PATENT DOCUMENTS

| EP | 1 164 326 A2 | 12/2001 |
| GB | 2 256 688 A | 12/1992 |
| WO | WO 93/16311 A1 | 8/1993 |

* cited by examiner

Primary Examiner—David Bagnell
Assistant Examiner—Giovanna M Collins
(74) Attorney, Agent, or Firm—Shinjyu Global IP Counselors, LLP

(57) ABSTRACT

A flexible slide joint is provided for accommodating axial, rotational and angular misalignments between two fluid conveying members. The flexible slide joint basically has first and second tube members with a sliding sealing member and a axially compressible element coupled therebetween. The sliding sealing member is configured and arranged to accommodate axial movement upon a first predetermined axial force occurring between the first and second tube members. The axially compressible element is configured and arranged to accommodate axial movement upon a second predetermined axial force occurring between the first and second tube members. The axially compressible element is force balanced relative to the sliding sealing member such that the second predetermined axial force is smaller than the first predetermined axial force.

34 Claims, 17 Drawing Sheets

FLEXIBLE SLIDE JOINT

BACKGROUND OF THE INVENTION

1. Field of the Invention

The present invention generally relates to a fluid-tight joint for connecting a pair of fluid conveying members together. More specifically, the present invention relates to a fluid-tight modular joint, which is flexible in that it permits axial movement between a pair of fluid conveying members.

2. Background Information

In high pressure and/or high temperature fluid applications, piping or ducting systems are generally designed to provide some degree of flexibility to allow for dimensional tolerances, thermal expansion and contraction, and vibrational deflections between various components which are connected by the piping. Thus, these piping or ducting systems often use flexible joints in the pipe to accommodate dimensional tolerances, thermal expansion and contraction, and vibrational deflections between various components. These types of flexible joints are often used in aircraft applications, power generation and other industrial applications requiring piping systems such flexibility. Examples of such prior flexible joints or couplings are disclosed in the following: U.S. Pat. Nos. 4,054,306 to Sadoff, Jr. et al; 4,071,268 to Halling et al; 4,071,269 to Hailing et al; 4,448,449 to Halling et al; and 4,553,775 to Halling.

Flexible joints must be sealed to prevent leakage even when flexing. To achieve sealing various seal types have been used including sliding seals like packing, TUBESEALS, piston rings, or flexible elements like bellows. Sliding seals can seal over a large range of motion but are able to endure only a limited number of displacement wear cycles. Flexible seals can seal over a limited range of motion but, when displacement is small, they can endure a large numbers of displacement cycles.

In most flex joint applications, the joint must be capable of displacing a large distance just a few times such as when they are being installed or removed for maintenance. In such instances sliding seals are a good solution. In service, the joints must displace again to accommodate the relatively slow but potentially large displacements resulting from thermal expansion, and again the sliding seal can be a good solution for these conditions. However, in applications where there is a significant amount of vibration, a sliding seal wears out quickly due to the very large number of relatively small displacements. In these applications, a flexible seal can be added to a joint that uses a sliding seal, and thus accommodate vibration while retaining all the benefits of the sliding seal.

In view of the above, there exists a need for flexible slide joint which overcomes the above mentioned problems in the prior art. This invention addresses this need in the prior art as well as other needs, which will become apparent to those skilled in the art from this disclosure.

SUMMARY OF THE INVENTION

One object of the present invention is to provide a flexible slide joint which is has an axially compressible element for small linear displacement and a sliding sealing member configured and arranged to accommodate larger linear movements between first and second tube members.

Another object of the present invention is to provide a flexible slide joint which is capable of enduring a very large number of small amplitude displacements.

Another object of the present invention is to provide a flexible slide joint which is light, compact and can be utilized in environments of extreme temperature.

Another object of the present invention is to provide a flexible slide joint that is easy to manufacture and install.

Another object of some embodiments of the present invention is to provide a flexible slide joint, which provides for angular misalignment between two tubes utilized in a piping system.

The foregoing objects are attained by providing a flexible slide joint that accommodates axial misalignments of a pair of fluid conveying members. The flexible slide joint basically has a first tube member, a second tube member, a sliding sealing member and an axially compressible element. The first tube member has a first center axis. The second tube member has a second center axis. The sliding sealing member is configured and arranged between the first and second tube members to accommodate axial movement between the first and second tube members upon a first predetermined axial force occurring between the first and second tube members. The axially compressible element is configured and arranged between the first and second tube members to accommodate axial movement between the first and second tube members upon a second predetermined axial force occurring between the first and second tube members. The axially compressible element is force balanced relative to the sliding sealing member such that the second predetermined axial force is smaller than the first predetermined axial force.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration purposes only and not for the purpose of limiting the invention as defined by the appended claims and their equivalents.

Figure 1:
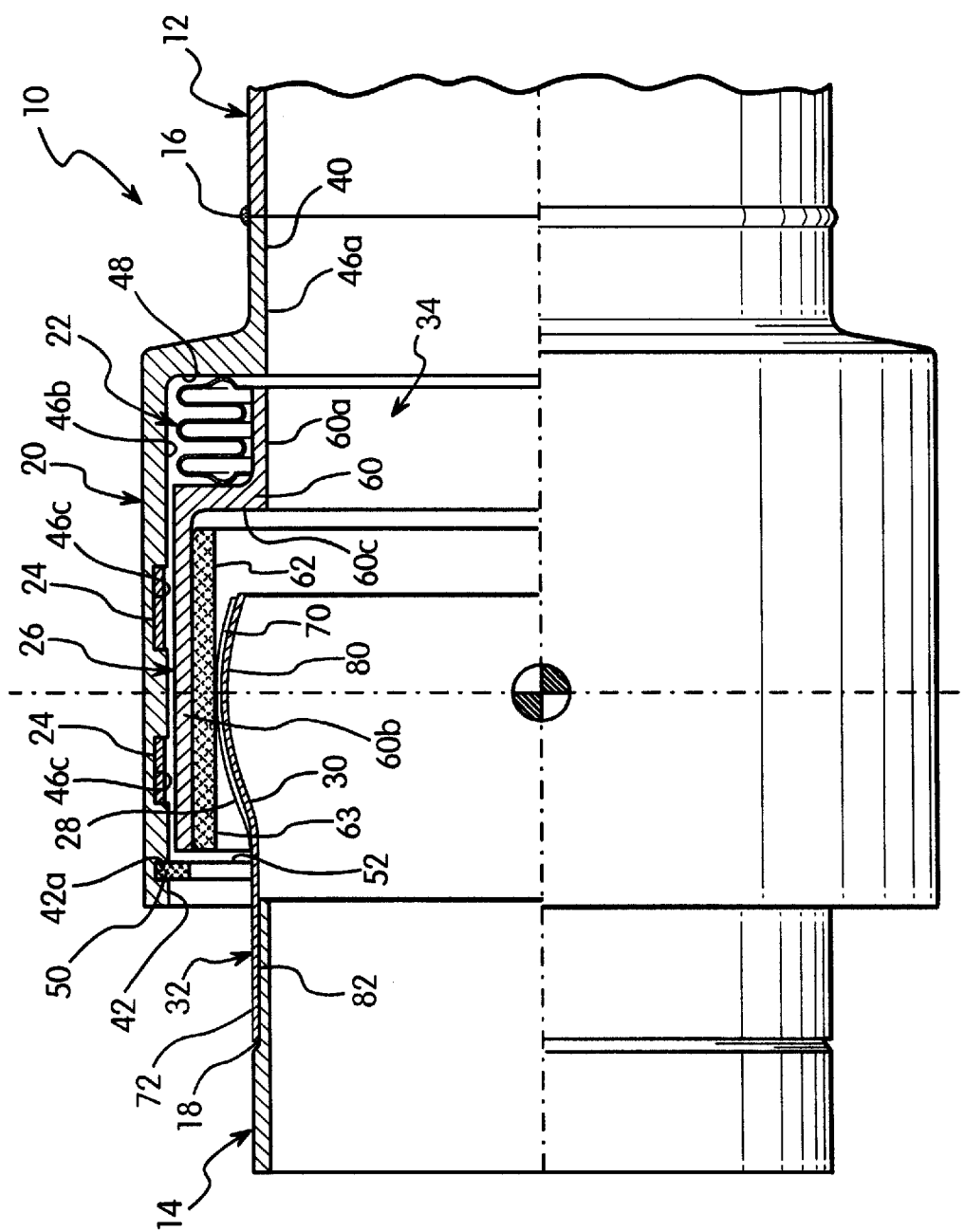
FIG. 1 is a side elevational view in partial longitudinal cross section of a flexible slide joint installed between first and second fluid conveying members in accordance with a first embodiment of the present invention.
Figure 2:
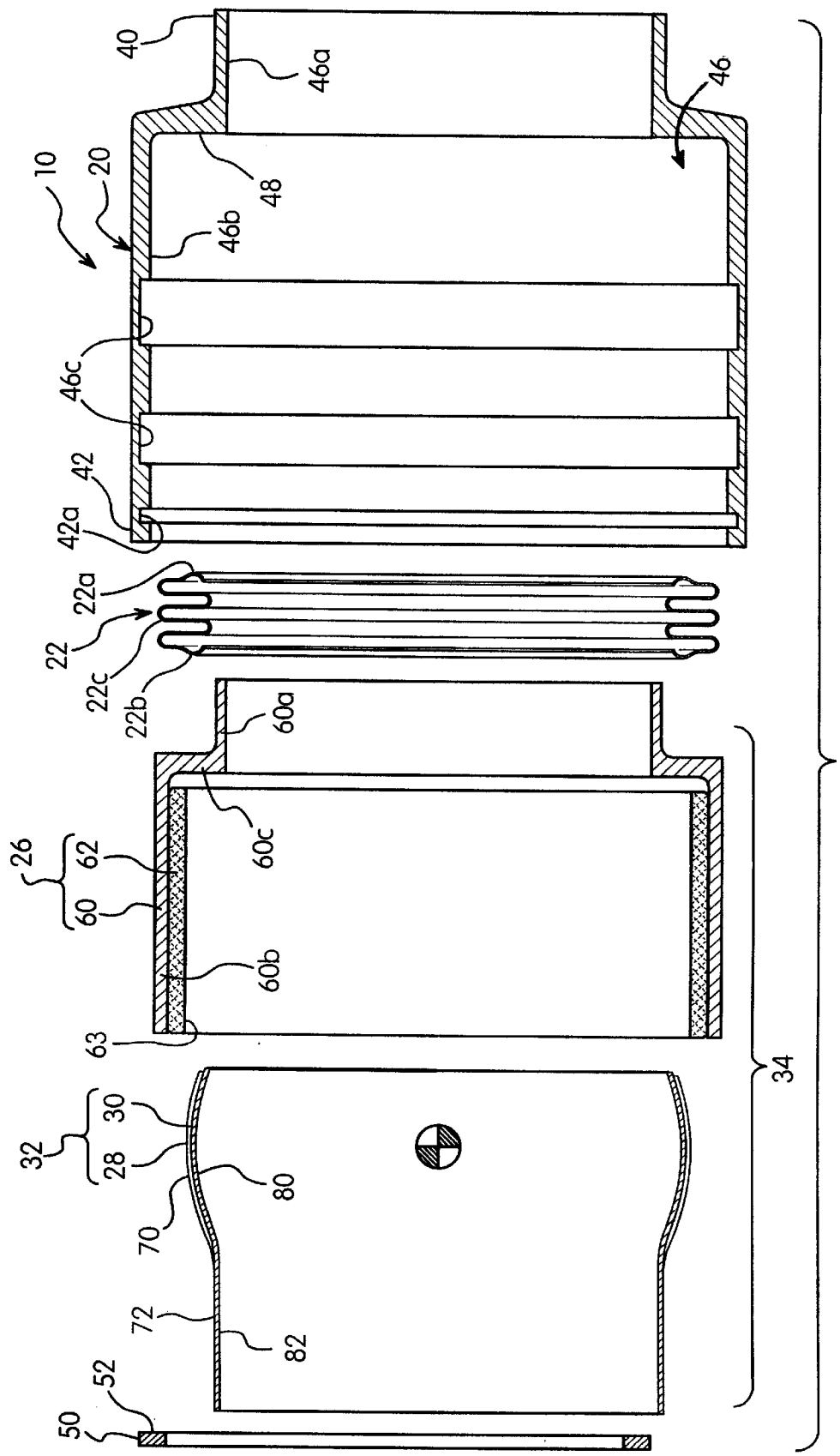
FIG. 2 is a longitudinal cross sectional view of selected parts of the flexible slide joint illustrated in FIG. 1 in accordance with the first embodiment of the present invention.

Referring initially to FIGS. 1 and 2, a flexible slide joint 10 is illustrated in accordance with a first embodiment of the present invention. Basically, the flexible slide joint 10 seals and interconnects first and second fluid conveying members 12 and 14 together to allow a high temperature and high pressure fluid to flow therethrough. The flexible slide joint 10 is designed to permit angular misalignment, axial movement and rotational movement between the first and second fluid conveying members 12 and 14. The first and second fluid conveying members 12 and 14 can be any type of fluid conveying members. Therefore, the structure of the first and second fluid conveying members 12 and 14 is not important to the present invention. In FIG. 1, the flexible slide joint 10 is fixed to the first fluid conveying member 12 by welding along a weld line 16, while the second fluid conveying member 14 is welded to the flexible slide joint 10 along a weld line 18 for forming a piping system in which a fluid flows therethrough.

The flexible slide joint 10 basically includes a tube adapter (first tube member) 20, an axially compressible element 22, a pair of guide elements 24, a sealing sleeve 26, a sealing tube 28 and a sealing tube liner (second tube member) 30 and a retaining ring 50. The sealing tube 28 and the sealing tube liner 30 form a sliding sealing member 32 that is slidably coupled to the sealing sleeve 26. A slideable sealing assembly 34 is formed by the sealing sleeve 26, the sealing tube 28 and the sealing tube liner 30. The joint 10 also include stops that in this embodiment are integral to tube adapter 20 and sealing sleeve 26 as discussed below.

In this embodiment, the axially compressible element 22 is a pressure energized seal such as an E-seal, which is sold by PerkinElmer Fluid Sciences. Of course, it will be apparent to those skilled in the art that other types of axially compressible seals or members can be used to carry out the present invention. The sealing sleeve 26 and the sealing tube 28 form a sliding seal that permits angular misalignment, axial movement and rotational movement between the tube adapter 20 and the sealing tube liner 30. The axially compressible element 22 is an axially resilient member that is designed to accommodate small axial movements in the flexible slide joint 10, while the sealing tube 28 accommodates larger axial movements in the flexible joint 10. The sealing tube 28 is also configured and arranged to accommodate angular movement upon a predetermined angular force occurring between the tube adapter 20 and the sealing tube liner 30. Thus, the sealing tube 28 is configured and arranged to accommodate large axial movements within a first predetermined range of axial movement upon a first predetermined axial force occurring between the first and second tube members. The axially compressible element 22 is configured and arranged to accommodate small axial movements within a second predetermined range of axial movement upon a second predetermined axial force occurring between the tube adapter 20 and the sealing tube liner 30. The force to compress the axially compressible element 22 is balanced relative to the force to slide the sealing tube 28 such that the second predetermined axial force of the axially compressible element 22 is smaller than the first predetermined axial force of the sealing tube 28.

The combination of the axially compressible element 22 and the sliding sealing member 32 in the flexible slide joint 10 provides flexibility in ducting or piping systems such as those used in aircraft applications, power generation and other industrial applications requiring piping systems with axial compensation. This flexibility of the flexible slide joint 10 accommodates installation tolerances, thermal expansion, external "gross" motion such as due to airframe deflection, and vibration deflections such as those due to rotating machinery, acoustic and aerodynamic noise. Typically the range of motion due to the different flexibility requirements is greatest for installation tolerances, less for thermal expansions, and least for vibration environments. Conversely, the number of cycles resulting from vibration can be very large, while the cycles resulting from thermal expansion are moderate, and the cycles resulting from installation are only occasional.

The axially compressible element 22 provides flexibility in the axial direction and very limited flexibility (small range of motion) in the angular direction. The axially compressible element 22 typically can endure millions of small deflection cycles. The axially compressible element 22 in this embodiment allows for some torsional movement.

The sealing tube 28 provides greater flexibility in axial, angular and torsional directions. In other words, the sealing tube 28 provides large range of motion flexibility in axial, angular and torsional directions. The sealing tube 28 acts as a connector between the first and second fluid conveying members 12 and 14. The sealing tube 28 is typically more limited than the axially compressible element 22 in the number of wear cycles that it can endure. Thus, the flexible slide joint 10 incorporates the best features of both the axially compressible element 22 and the sliding sealing member 32 into a single joint. The flexible slide joint 10 allows the sliding sealing member 32 sliding to accommodate large axial displacements and angulation of the flexible slide joint 10, while the axially compressible element 22 and the sealing sleeve 26 provides freedom of motion for small displacement cycles.

The design requires a force balance between the force to slide of the sliding sealing member 32 and the force to compress the axially compressible element 22. It is necessary for the sliding force of the sliding sealing member 32 to be stiffer than the deflection force of the axially compressible element 22 over the range of motion where vibration effects are to be eliminated. The sliding sealing member 32 takes some vibration motion but the intent is to eliminate with the axially compressible element 22 as much vibration motion as possible.

The design also requires a degree of force or pressure balance between the pressure end "plug" load of the tubular sealing member 32 and the pressure end "plug" load of the axially compressible element 22. If the plug loads are not balanced, then the axially compressible element 22 will inadvertently move by some amount. If it moves too far then the sealing sleeve 26 will bottom its stops, as described below, or, if stops are not adequate then the tubular sealing member 32 could unplug from the tube adapter 20. If the sealing sleeve 26 bottoms out then it cannot move to accommodate vibration movements. Thus, the means diameter of the axially compressible element 22 and the inner diameter of the sealing sleeve 26 should be sized to prevent the sleeve 26 from bottoming out where it cannot move to accommodate vibration movements. Preferably, the means diameter of the axially compressible element 22 and the inner diameter of the sealing sleeve 26 are relatively close in size.

The axially compressible element 22 and the sliding sealing member 32 are arranged so that they move in series. The axially compressible element 22 is preferably constrained to allow movement only in the axial direction. The axial movement of the axially compressible element 22 is also constrained by axial stops as discussed below. In some variants, there are also radial springs or bearings that guide the axially compressible element 22, cushion radial motion, and reduce guide wear. The sliding sealing member 32 moves by sliding in the wear resistant sealing sleeve 26.

Another consideration in design is the inadvertent effect of adding a degree of angular freedom to the flexible slide joint 10. It is necessary to prevent the sealing sleeve 26 from cyclic angulation on the tubular sealing member 32 as in the case of lateral vibration loads. Angulation of the sealing sleeve 26 is limited by locating the tubular sealing tube 28 between the guide elements 24 to the degree possible.

As seen in FIGS. 1 and 2, the tube adapter 20 has a first open end 40 rigidly coupled to the first fluid conveying member 12 via a weld along the weld line 16, a second open end 42 for slideably receiving the sliding sealing sleeve 26 therein via clearance fit. The second open end 42 has an annular groove 42a that receives a snap ring 50 to retain the sealing sleeve 26 within the tube adapter 20. The tube adapter 20 has a step shaped tubular inner surface 46 extending between first open end 40 and second open end 42. The inner surface 46 of the tube adapter 20 basically has two (first and second) cylindrical surfaces 46a and 46b. The first cylindrical surface 46a is located adjacent the first open end 40, while the second cylindrical surface 46b is located adjacent the second open end. The first cylindrical surface 46a has a smaller diameter than the second cylindrical surface 46b. In the illustrated embodiment. The tubular inner surface 46 is concentrically arranged about the longitudinal axis of the joint 10 when the joint is in perfect alignment. The tube adapter 20 is preferably a machined member constructed of a hard, rigid, metallic material.

An annular stop surface or abutment 48 extends inwardly in a radial direction between the first and second cylindrical surfaces 46a and 46b to form a first axial stop or abutment surface adjacent the first open end 40 of the tube adapter 20. The second open end 42 of the tube adapter 20 has the snap ring 50 coupled thereto so as to form a second axial stop or abutment surface 52. The first and second axial stop surfaces 48 and 52 control or limit axial movement (expansion and contraction) of the axially compressible element 22. More specifically, the axial movement of the sealing sleeve 26 is controlled by the first and second axial stop surfaces 48 and 52, which in turn control or limit axial movement (expansion and contraction) of the axially compressible element 22. In the illustrated embodiment, the axially compressible element 22 is disposed axially between the tube adapter 20 and the sealing sleeve 26. Thus, the axially compressible element 22 seals the interface between the inner surface 46 of the tube adapter 20 and the outer surface of the sealing sleeve 26. Of course, the axially compressible element 22 can be disposed at other locations.

In this embodiment, the second cylindrical surface 46b has two annular grooves 46c that receive and retain the guide elements 24 therein. The guide elements 24 are illustrated as metallic wave washers that slideably support the sealing sleeve 26 within the second cylindrical surface 46b between the stops 48 and 52. Of course, it will be apparent to those skilled in the art that the guide elements 24 can be replaced with any suitable type of guide structure. Also, in many applications, the guide elements 24 can be omitted if needed and/or desired. Moreover, it will be apparent to those skilled in the art that a single guide element could be utilized (i.e. one of the guide elements could be removed) if needed and/or desired.

The axially compressible element 22 is a relatively conventional flexible seal with a plurality of convolutions. An example of a multiple convolution sealing ring that is suitable for the present invention is disclosed in U.S. Pat. No. 4,121,843 to Halling, which is hereby incorporated herein by reference. The axially compressible element 22 is preferably a metallic accordion shaped member with a first annular sealing end 22a contacting the annular surface 48 of the tube adapter 20 and a second annular sealing end 22b contacting the sealing sleeve 26. Multiply convolutions 22c extend between ends 22a and 22b.

The sliding sealing member 32 is preferably a modified version of the tubular sealing member disclosed in U.S. Pat. No. 4,553,775 to Halling, which is hereby incorporated herein by reference. However, the flexible slide joint 10 does not have to be used with the sealing tube 28, but can be used with other types of annular sliding sealing members. Alternatively, the concept of the present invention can also be applied to other flex slide joints like piston ring joints where the piston rings have a high force to slide and only move when the bellows travel is exceeded. In such joints, the piston rings move to accommodate assembly tolerances and other large displacements that are not practical to handle with a bellows, and the bellows accommodates the small vibration induced motion.

As seen in FIGS. 1 and 2, the sealing sleeve 26 includes an outer tubular or cylindrical support member 60, and an inner tubular or cylindrical wear-resistant element 62 fixedly coupled within the support member 60. Accordingly, the sealing sleeve 26 is preferably a two-piece unit with the support member 60 and the wear-resistant element 62 fixedly and rigidly coupled together as an integral unit. The support member 60 is preferably constructed of a hard, rigid material. The wear-resistant element 62, on the other hand, is preferably constructed of a non-metallic material having a low coefficient of friction. The support member 60 is a step shaped tubular member having a first cylindrical section 60a with a first open end 56 and a second cylindrical section 60b with a second open end 58 so that fluid can flow therethrough. A radial section 60c extends radial between the first and second cylindrical sections 60a and 60b. The radial section 60c has an annular axially facing surface that is in contacts with the axially compressible element 22 to create a seal therebetween.

The wear-resistant element 62 is preferably rigidly coupled to the support member 60 by heating the support member 60 so that its inner cylindrical surface expands, and then inserting the wear-resistant element 62 therein such that upon cooling of the support member 60, the wear-resistant element 62 is rigidly and fixedly coupled within the support member 60. The wear-resistant element 62 has a smooth cylindrical inner surface 63 for engaging the sealing tube 28 to allow rotational movement, angular movement, and axial linear movement therebetween. As mentioned above, the sealing sleeve 26 and the sealing tube 28 form the sliding sealing member 32.

The sealing tube 28 is preferably an annular, resilient metallic member, which is fixedly coupled to the rigid annular tube liner 30. The sealing tube 28 is basically disclosed in U.S. Pat. No. 4,553,755 to Halling. This metallic resilient sealing tube 28 is elastically deformable and forms an interference fit with wear-resistant element 62 in substantially the same manner as discussed in U.S. Pat. No. 4,553,755 to Halling. The sealing tube 28 comprises a first spherical end portion 70 and a second cylindrical end portion 72 extending from the spherical end portion 70.

The sealing tube liner 30 is a rigid metallic member that supports the sealing tube 28 thereon. The sealing tube liner 30 has a first spherical end portion 80 and a second cylindrical end portion 82 extending from the spherical end portion 80. The cylindrical end portion 82 of the sealing tube liner 30 is welded to the second fluid conveying member 14 so that the sealing tube 28 and the sealing tube liner 30 move with the second fluid conveying member 14. The sealing tube 28 overlies the sealing tube liner 30 with the cylindrical end portion 72 of the sealing tube 28 welded to the outer surface of the cylindrical end portion 82 of the sealing tube liner 30. The spherical end portion 80 has a smaller curvature than the spherical end portion 70. Thus, an annular space is formed between the spherical end portions 70 and 80 of the sealing tube 28 and the sealing tube liner 30.

The interference fit must be relatively light to keep friction forces low to permit relative sliding and rotation of the sealing tube 28 and the cylindrical inner surface 63 and to insure that the resilient sealing element is not stressed beyond its elastic limit.

There are many variants that can be considered in the design of the flexible slide joint 10 of the present invention. The variants could each have value depending on the application of the joint 10. For example, where the axially compressible element 22 and stops are located in the joint 10 relative to the sliding sealing member 32 can be changed depending on the application of the joint 10. Also where the axially compressible element 22 and stops are attached to the tube adapter 20 can be changed depending on the application of the joint 10. For manufacturing there are variants on the configuration of the stops, and attachment of the axially compressible element 22. For service there are variants to allow refurbishing.

In operation the flexible slide joint 10 performs as follows. The mechanic installs the flexible slide joint 10 between first and second tube members 12 and 14. The sliding sealing member 32 slides in the bore to accommodate installation tolerances. The axially compressible element 22 compresses or extends to fit within the range of motion permitted by the mechanical stops. The system is started once the duct and supporting structure expand thermally. Ignoring vibration for a moment, the sliding sealing member 32 slides to a new position to relieve thermal stresses in the duct. As the duct expands the axially compressible element 22 is deflected to move the sliding sealing sleeve 26 until the stops are engaged in either compression or extension.

Now, the situation will be considered in which the system is running and considering vibration. When the system starts to vibrate the mechanical stops 48 and 52 push the sliding sealing sleeve 26 to a new position on the sealing tube 28 to allow free movement of the axially compressible element 22. Now, the axially compressible element 22 is free to cycle axially to the extent allowed by the stops 48 and 52. If the vibration displacement increases then the sliding sealing sleeve 26 will be pushed via its stops 48 and 52 until the axially compressible element 22 is again free to move. Any time travel exceeds clearance between the stops then the sliding sealing sleeve 26 will again move.

The stops 48 and 52 enable the axially compressible element 22 to have a low spring rate. In other words, the stops 48 and 52 make sure the deflection forces of the axially compressible element 22 are always much lower than the force to slide the sealing tube 28.

There may be extreme conditions where the sliding sealing sleeve 26 is forced to slide a small amount at the end of each cycle. In this condition, wear would take place but the bulk of the wear cycle could be eliminated. It would also be desirable practice to determine the expected range of vibration motion and design the axially compressible element 22 and stops to handle it.

Second Embodiment

Figure 3:
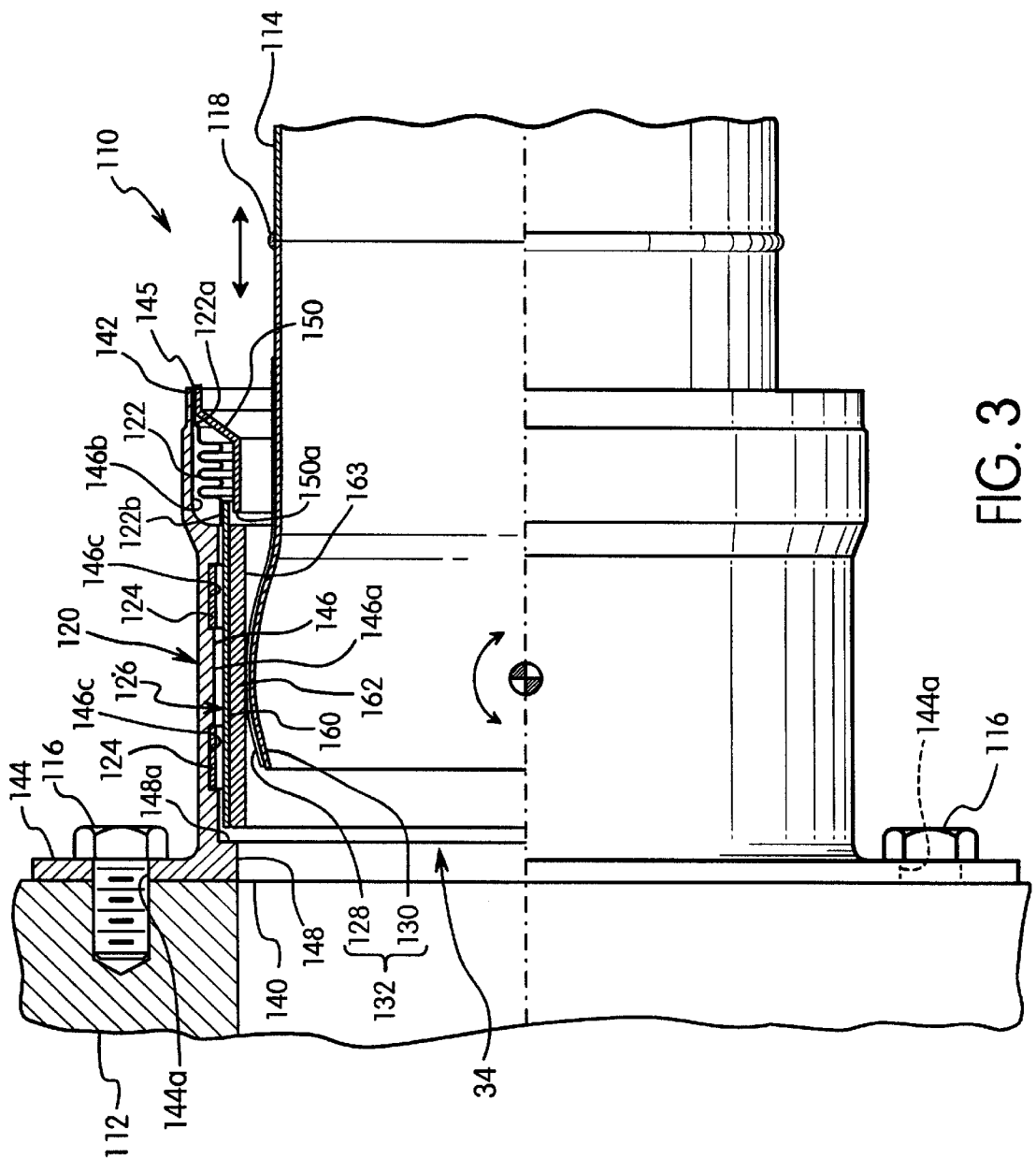
FIG. 3 is a side elevational view in partial longitudinal section of a flexible slide joint installed between first and second fluid conveying members in accordance with a second embodiment of the present invention.
Figure 4:
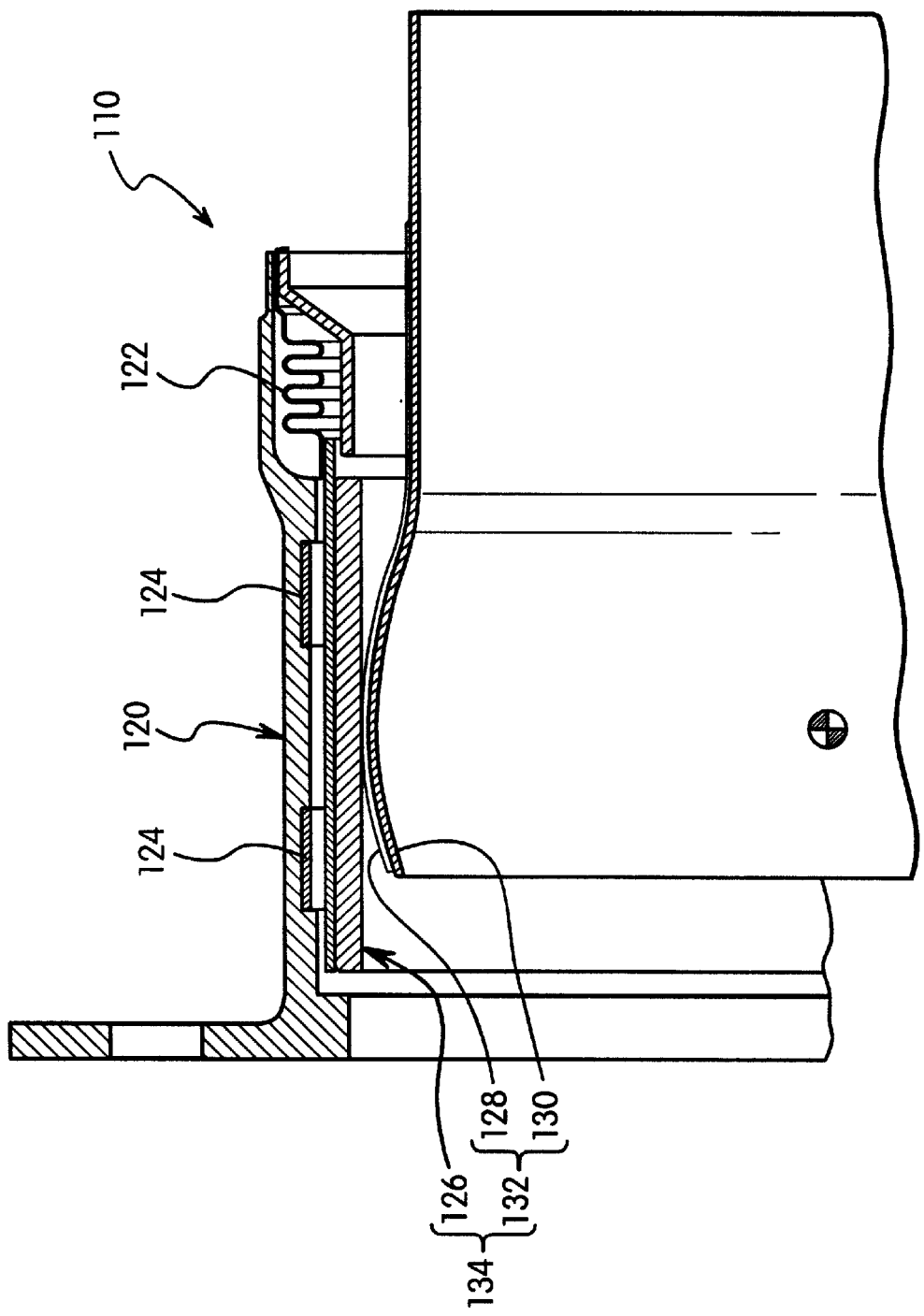
FIG. 4 is an enlarged longitudinal cross sectional view of the flexible slide joint illustrated in FIG. 3 in accordance with the second embodiment of the present invention.
Figure 5:
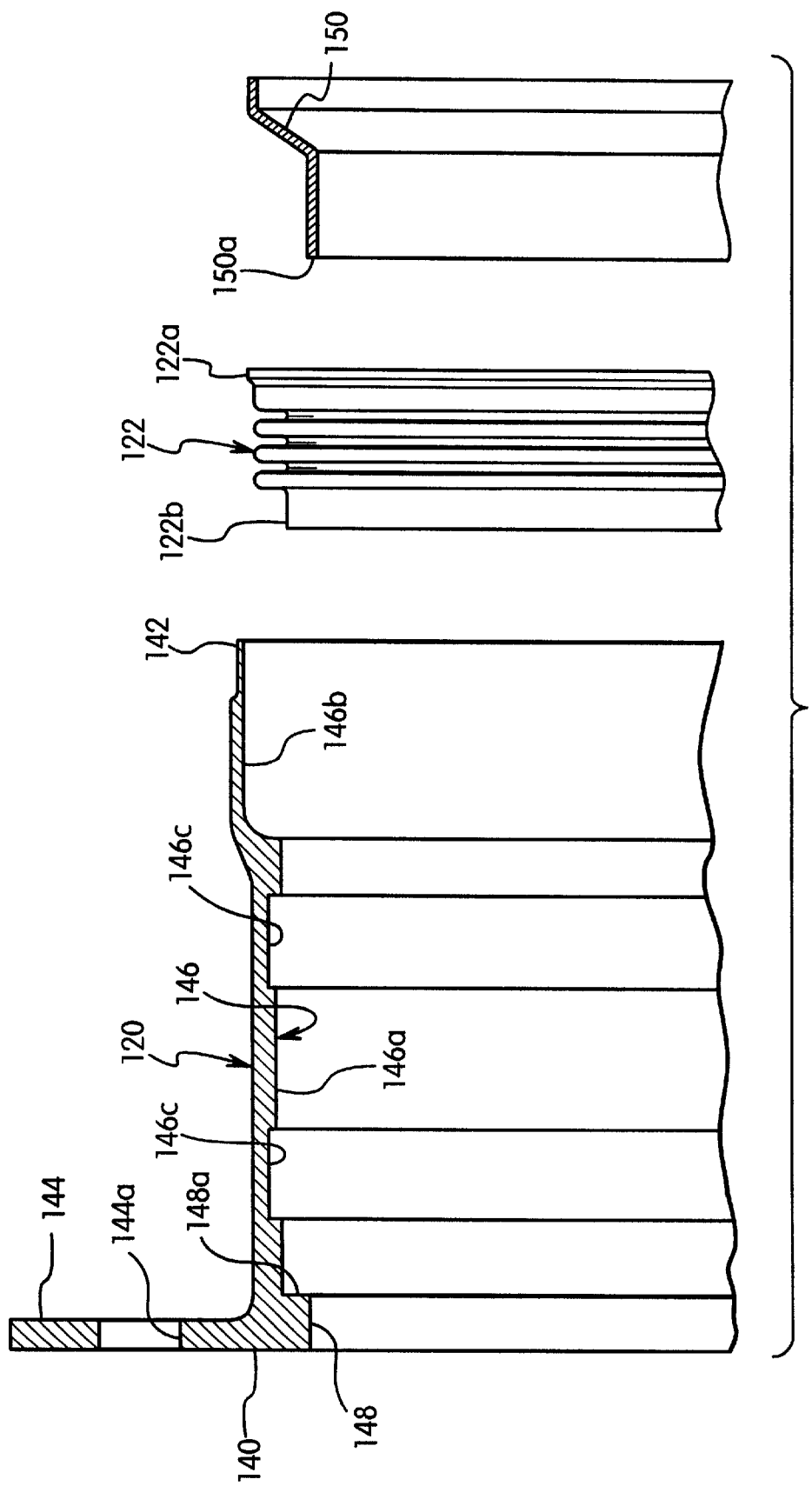
FIG. 5 is an enlarged longitudinal cross sectional view of selected portions of the flexible slide joint illustrated in FIGS. 3 and 4 in accordance with the second embodiment of the present invention.

Referring initially to FIGS. 3–5, a flexible slide joint 110 is illustrated in accordance with a second embodiment of the present invention. Basically, the first and second embodiments function in the same way. In view of the similarity between the first and second embodiments, the following description will mainly focus on the differences between the first and second embodiments.

Basically, the flexible slide joint 110 seals and interconnects first and second fluid conveying members 112 and 114 together to allow a high temperature and high pressure fluid to flow therethrough. The flexible slide joint 110 is designed to permit angular misalignment, axial movement and rotational movement between the first and second fluid conveying members 112 and 114. The first and second fluid conveying members 112 and 114 can be any type of fluid conveying members. Therefore, the structure of the first and second fluid conveying members 112 and 114 is not important to the present invention. In FIG. 3, the flexible slide joint 110 is fixed to the first fluid conveying member 112 by a plurality of bolts 116 (only two shown), while the second fluid conveying member 112 is welded to the flexible slide joint 110 along a weld line 118 for forming a piping system in which a fluid flows therethrough.

The flexible slide joint 110 basically includes a tube adapter (first tube member) 120, a bellows or axially compressible element 122, a pair of guide elements 124, a sealing sleeve 126, a sealing tube 128 and a sealing tube liner (second tube member) 130. The sealing sleeve 126 and the sealing tube 128 form a sliding seal that permits angular misalignment, axial movement and rotational movement between the tube adapter 120 and the sealing tube liner 130. In other words, the sealing tube 128 is configured and arranged to accommodate angular movement upon a predetermined angular force occurring between the tube adapter 120 and the sealing tube liner 130. Furthermore, the sealing tube 128 is configured and arranged to accommodate axial movement upon a first predetermined axial force occurring between the first and second tube members. The bellows 122 is configured and arranged to accommodate axial movement upon a second predetermined axial force occurring between the tube adapter 120 and the sealing tube liner 130. The bellows 122 force to compress is balanced relative to the force to slide the sealing tube 128 such that the second predetermined axial force of the bellows 122 is smaller than the first predetermined axial force of the sealing tube 128.

The combination of the bellows 122 and the sliding sealing member 132 in the flexible slide joint 110 provides flexibility in ducting systems such as those used in aircraft applications. This flexibility of the flexible slide joint 110 accommodates installation tolerances, thermal expansion, external "gross" motion such as due to airframe deflection, and vibration deflections such as those due to rotating machinery, acoustic and aerodynamic noise. Typically the range of motion due to the different flexibility requirements is greatest for installation tolerances, less for thermal expansions, and least for vibration environments. Conversely, the number of cycles resulting from vibration can be very large, while the cycles resulting from thermal expansion are moderate, and the cycles resulting from installation are only occasional.

The bellows 122 provides flexibility in the axial direction and limited flexibility (small range of motion) in the angular direction. The bellows 122 typically can endure millions of small deflection cycles. The bellows 122 does not provide for torsional movement. The bellows 122 is typically welded to duct systems, but other attachment methods can be utilized without departing from the basic concept of the present invention.

The sealing tube 128 provides flexibility in axial, angular and torsional directions. The sealing tube 128 provides large range of motion flexibility in axial, angular and torsional directions. The sealing tube 128 acts as a connector between the first and second fluid conveying members 112 and 114. The sealing tube 128 is typically more limited than the bellows 122 in the number of wear cycles that it can endure. Thus, the flexible slide joint 110 incorporates the best features of both bellows 122 and the sliding sealing member 132 into a single joint. The flexible slide joint 110 allows the sliding sealing member 132 sliding to accommodate large axial displacements and angulation of the flexible slide joint 110, while the bellows 122 provides freedom of motion for small displacement cycles.

The design requires a force balance between the force to slide of the sliding sealing member 132 and the force to compress the bellows 122. It is necessary for the sliding force of the sliding sealing member 132 to be stiffer than the deflection force of the bellows 122 over the range of motion where vibration effects are to be eliminated. The sliding sealing member 132 takes some vibration motion but the intent is to eliminate with the bellows 122 as much vibration motion as possible.

The design also requires a degree of force balance between the pressure end "plug" load of the tubular sealing member 132 and the pressure end "plug" load of the bellows 122. If the plug loads are not balanced, then the bellows 122 will move by some amount. If it moves too far then the sleeve 126 will bottom its stops, as described below, or, if stops are not adequate then the tubular sealing member 132 could unplug from the tube adapter 120. If the sleeve 126 bottoms out then it cannot move to accommodate vibration movement.

The bellows 122 and the sliding sealing member 132 are arranged so that they move in series. The bellows 122 is preferably constrained to allow movement only in the axial direction. The axial movement of the bellows 122 is also constrained by axial stops as discussed below. In some variants, there are also radial springs or bearings that guide the bellows 122, cushion radial motion, and reduce guide wear. The sliding sealing member 132 moves by sliding in the wear resistant sealing sleeve 126.

Another consideration in design is the inadvertent effect of adding a degree of angular freedom to the flexible slide joint 110. It is necessary to prevent the sealing sleeve 126 from cyclic angulation on the tubular sealing member 132 as in the case of lateral vibration loads. Angulation of the sleeve 126 is limited by locating the sealing tube 128 between the guide elements 124 to the degree possible.

As best seen in FIGS. 3–6, the tube adapter 120 has a first open end 140 rigidly coupled to the first fluid conveying member 112 via the bolts 116, a second open end 142 for receiving a part of sliding sealing sleeve 126 therein via clearance fit. A tubular inner surface 146 extending between first open end 140 and second open end 142. In this embodiment, the tubular inner surface 146 is concentrically arranged about the longitudinal axis of the joint 110 when the joint is in perfect alignment. The tube adapter 120 is preferably a machined member constructed of a hard, rigid, metallic material.

An annular mounting flange 144 extends outwardly in a radial direction from the first open end 140 of the tube adapter 120. The mounting flange 144 has a plurality of mounting holes 144a formed therein that receive the bolts 116 to fixedly secure the tube adapter 120 to the first fluid conveying member 112. The second open end 142 of the tube adapter 120 has the bellows 122 fixedly secured thereto by welding along weld line 145. The bellows 122 is coaxially mounted within the tube adapter 120.

An annular stop flange 148 extends inwardly in a radial direction from the inner surface 146 to form a first axial stop or abutment surface 148a at the first open end 140 of the tube adapter 120. The second open end 142 of the tube adapter 120 has a tubular stop element 150 welded thereto along the weld line 145 to form a second axial stop or abutment surface 150a. The first and second axial stops 148a and 150a control or limit axial movement (expansion and contraction) of the bellows 122. More specifically, the axial movement of the sealing sleeve 126 is controlled by the first and second axial stops 148a and 150a, which in turn control or limit axial movement (expansion and contraction) of the bellows 122. In the illustrated embodiment, the bellows 122 is disposed between the stop element 150 and the tube adapter 120. Of course, the bellows 122 and stops 148a and 150a can be disposed at other locations.

The inner surface 146 of the tube adapter 120 basically has two (first and second) cylindrical surfaces 146a and 146b located between the annular stop flange 148 and the second open end 142. The first cylindrical surface 146a is located adjacent the first open end 140, while the second cylindrical surface 146b is located adjacent the second open end. The first cylindrical surface 146a has a smaller diameter than the second cylindrical surface 146b.

In this embodiment, the first cylindrical surface 146a has two annular grooves 146c that receive and retain the guide elements 124 therein. The guide elements 124 are illustrated as metallic wave washers that slideably support the sealing sleeve 126 within the first cylindrical surface 146a between the stops 148a and 150a. Of course, in many applications, the guide elements 124 can be omitted, as discussed below with reference to another preferred embodiment of the present invention. Moreover, it will be apparent to those skilled in the art that a single guide element could be utilized (i.e. one of the guide elements could be removed) if needed and/or desired.

The bellows 122 is a relatively conventional flexible seal with a plurality of convolutions. An example of a bellows that is suitable for the present invention is disclosed in U.S. Pat. No. 4,643,463 to Halling et al., which is hereby incorporated herein by reference. The bellows 122 is preferably a metallic accordion shaped member with a first end 122a to the second open end 142 of the tube adapter 120 along the weld line 145 and a second end 122b attached by welding or other means known by those skilled in the art to the sealing sleeve 126. The stop element 150 is also preferably welded to the second open end 142 of the tube adapter 120 along the weld line 145.

The sliding sealing member 132 is preferably similar to the tubular sealing member disclosed in U.S. Pat. No. 4,553,775 to Halling, which is hereby incorporated herein by reference. However, the flexible slide joint 110 does not have to be used with sealing tube 128, but can be used with other types of annular sliding sealing members. Alternatively, the concept of the present invention can also be applied to other flex slide joints like piston ring joints where the piston rings have a high force to slide and only move when the bellows travel is exceeded. In such joints, the piston rings move to accommodate assembly tolerances and other large displacements that are not practical to handle with a bellows, and the bellows accommodates the small vibration induced motion.

Figure 6:
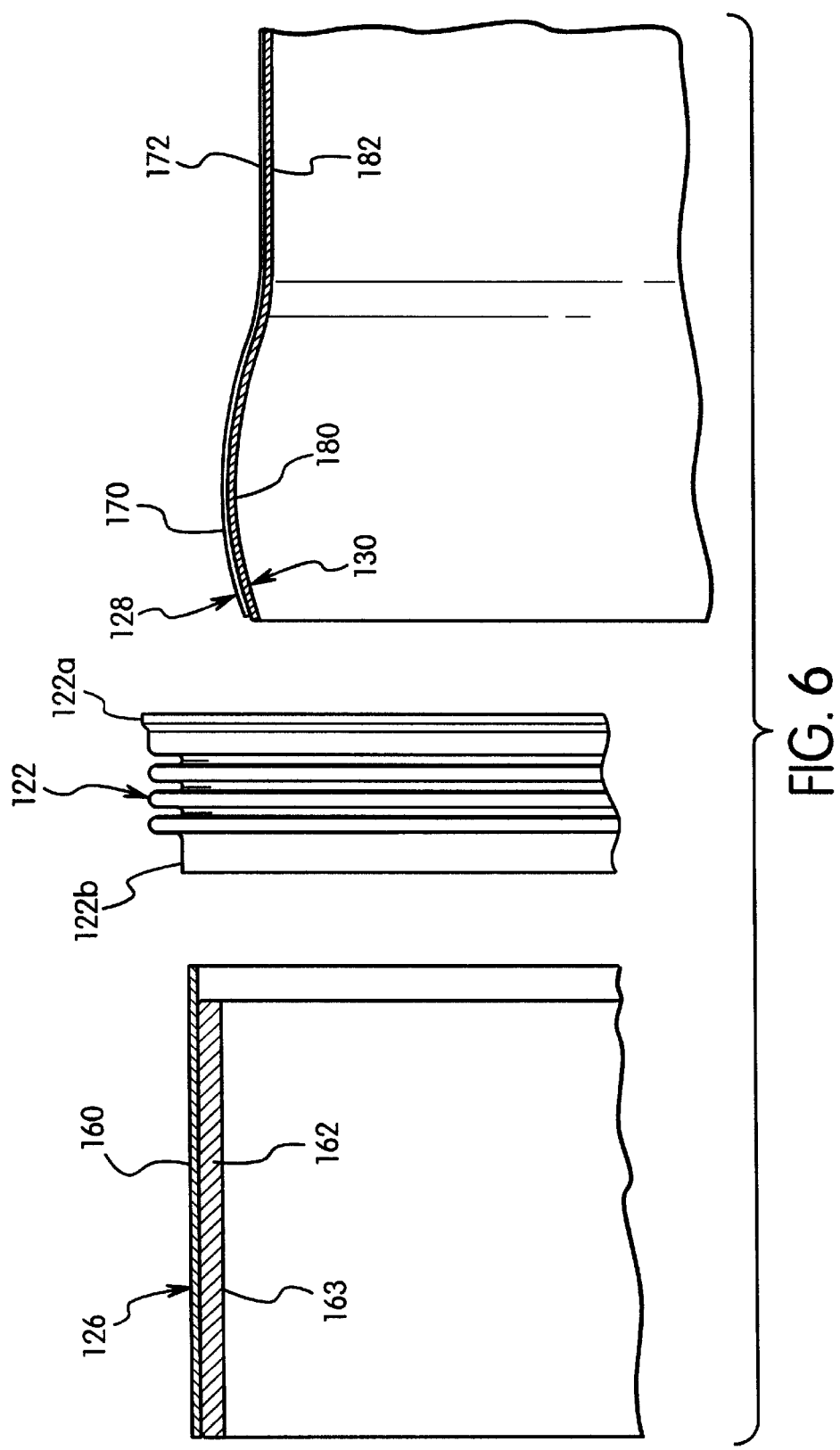
FIG. 6 is an enlarged longitudinal cross sectional view of selected portions of the flexible slide joint illustrated in FIGS. 3–5 in accordance with the second embodiment of the present invention.

As seen in FIGS. 3 and 6, the sealing sleeve 126 of the slideable sealing arrangement 134 is a substantially tubular or cylindrical member having a first open end and a second open end so that fluid can flow therethrough. The sealing sleeve 126 includes an outer tubular or cylindrical support member 160, and an inner tubular or cylindrical wear-resistant element 162 fixedly coupled within support member 160. Accordingly, the sealing sleeve 126 is preferably a two-piece unit with support member 160 and the wear-resistant element 162 fixedly and rigidly coupled together as an integral unit. The support member 160 is preferably constructed of a hard, rigid material. The wear-resistant element 162, on the other hand, is preferably constructed of a non-metallic material having a low coefficient of friction. The outer surface of the sleeve 126 is sized to provide fit for sliding contact with the guide elements 124 in the tube adapter 120. The sleeve bore 163 is sized to support the sealing tube 128 in an interference fit.

The sealing tube 128 is preferably an annular, resilient metallic member, which is fixedly coupled to the rigid annular tube liner 130. The sealing tube 128 is basically disclosed in U.S. Pat. No. 4,553,755 to Halling. This metallic resilient sealing tube 128 is elastically deformable and forms an interference fit with wear-resistant element 162 in substantially the same manner as discussed in U.S. Pat. No. 4,553,755 to Halling. The sealing tube 128 comprises a first spherical end portion 170 and a second cylindrical end portion 172 extending from the spherical end portion 170. The sealing tube 128 has an outer surface 174 and an inner surface 176.

The sealing tube liner 130 is a rigid metallic member that supports the sealing tube 128 thereon. The sealing tube liner 130 has a first spherical end portion 180 and a second cylindrical end portion 182 extending from the spherical end portion 180. The cylindrical end portion 182 of the sealing tube liner 130 is welded to the second fluid conveying member 114 so that the sealing tube 128 and the sealing tube liner 130 move with the second fluid conveying member 114. The sealing tube 128 overlies the sealing tube liner 130 with the cylindrical end portion 172 of the sealing tube 128 welded to the outer surface of the cylindrical end portion 182 of the sealing tube liner 130. The spherical end portion 180 has a smaller curvature than the spherical end portion 170. Thus, an annular space is formed between the spherical end portions 170 and 180 of the sealing tube 128 and the sealing tube liner 130.

The interference fit must be relatively light to keep friction forces low to permit relative sliding and rotation of the sealing tube 128 and the cylindrical inner surface 163 and to insure that the resilient sealing element is not stressed beyond its elastic limit.

Figure 7:
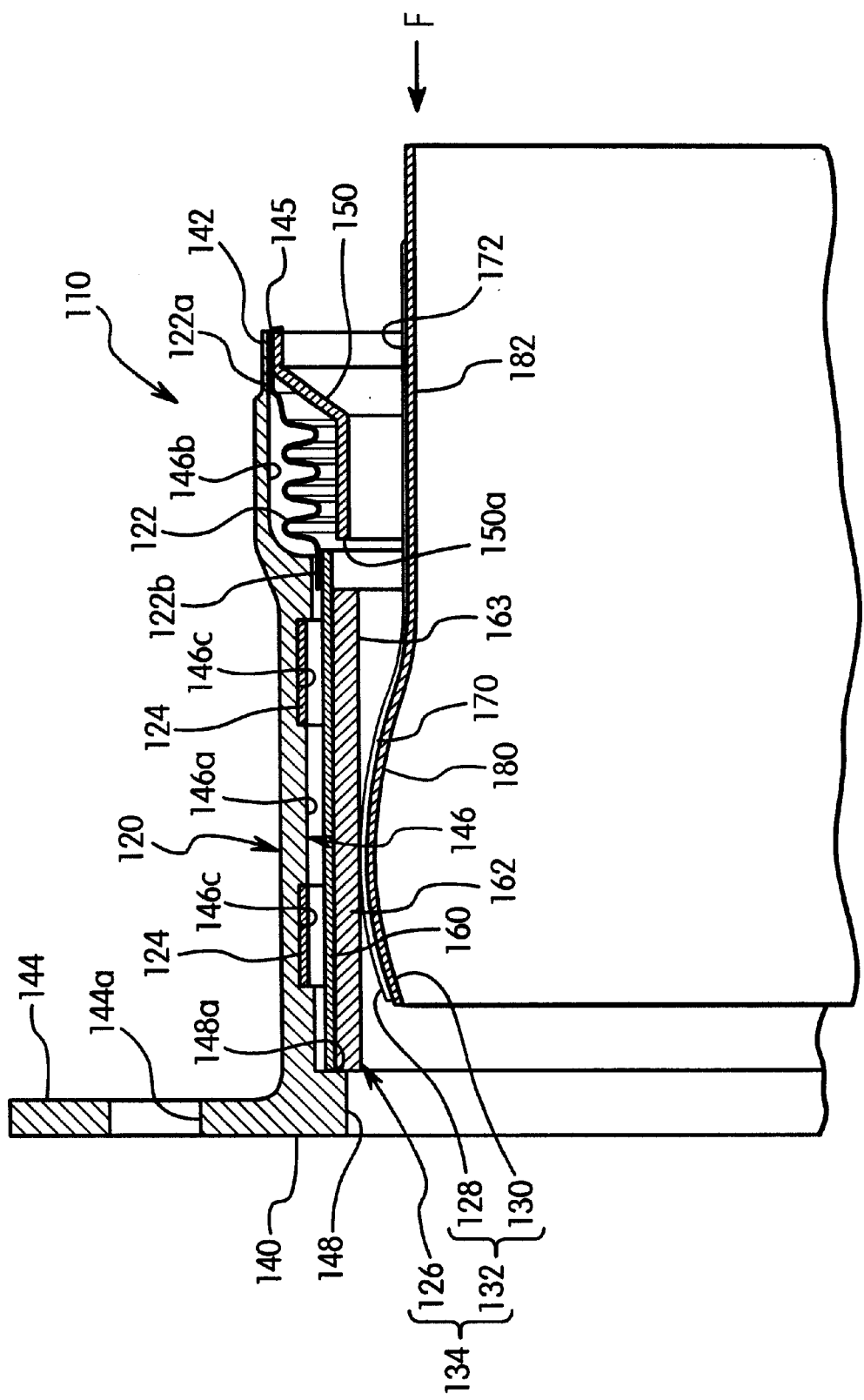
FIG. 7 is an enlarged longitudinal cross sectional view, similar to FIG. 4, of the flexible slide joint in accordance with the second embodiment of the present invention illustrated in FIG. 3, but after the flexible slide joint has experienced axial displacement in a first direction.
Figure 8:
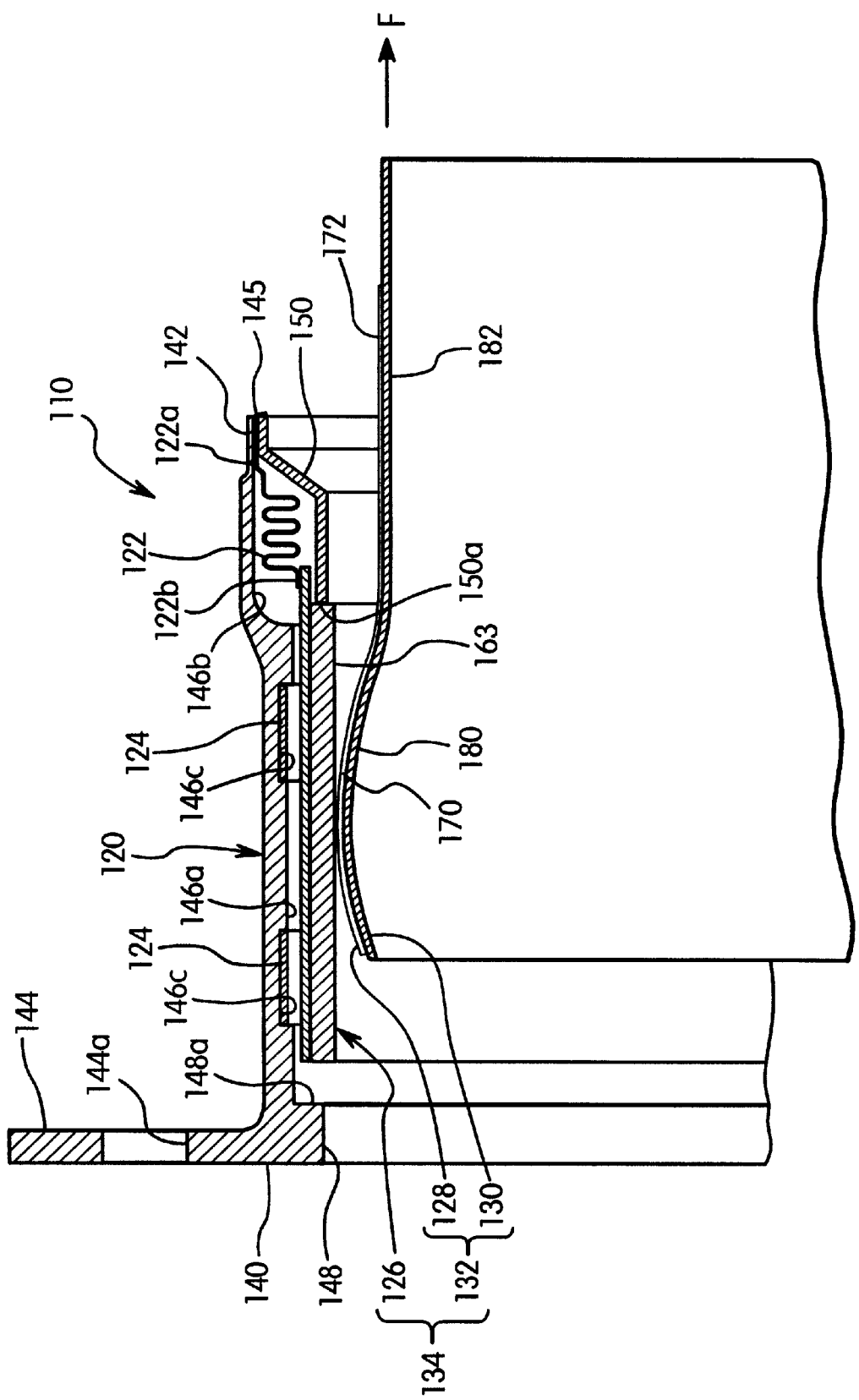
FIG. 8 is an enlarged longitudinal cross sectional view, similar to FIGS. 4 and 7, of the flexible slide joint in accordance with the second embodiment of the present invention illustrated in FIG. 3, but after the flexible slide joint has experienced axial displacement in a second direction.

Referring now to FIGS. 7 and 8, the apparatus shown in FIG. 3 is shown in which the sealing tube liner 130 and the sealing tube 128 have been axially displaced relative to the tube adapter 120, such as by thermal expansion or mechanical forces experienced by the piping system formed by the first and second fluid conveying members 112 and 114 (shown in FIG. 3 only). However, although the sealing tube liner 130 and the tube adapter 120 have experienced such axial displacement, the seals utilized in the apparatus maintain their sealing contact. Thus, the sealing tube 128 maintains its sealing contact with the cylindrical inner surface 163 of the wear-resistant element 162 despite the axial displacement between these members.

In operation the flexible slide joint 110 performs as follows. The mechanic installs the flexible slide joint 110 between first and second tube members 112 and 114. The sliding sealing member 132 slides in the bore to accommodate installation tolerances. The bellows 122 compresses or extends to fit within the range of motion permitted by the mechanical stops. The system is started once the duct and supporting structure expand thermally. Ignoring vibration for a moment, the sliding sealing member 132 slides to a new position to relieve thermal stresses in the duct. As the duct expands the bellows 122 is deflected until stops are engaged in either compression or extension.

Now, the situation will be considered in which the system is running and considering vibration. When the system starts to vibrate the mechanical stops push the sliding sealing sleeve 126 to a new position on the tubular sealing tube 128 to allow free movement of the bellows 122. Now, the bellows 122 is free to cycle axially to the extent allowed by the stops. If the vibration displacement increases then the sliding sealing sleeve 126 will be pushed via its stops until the bellows 122 is again free to move. Any time travel exceeds clearance between the stops then the sliding sealing sleeve 126 will again move.

There may be extreme conditions where the sliding sealing sleeve 126 is forced to slide a small amount at the end of each cycle. In this condition wear would take place but the bulk of the wear cycle could be eliminated. It would also be desirable practice to determine the expected range of vibration motion and design the bellows 122 and stops to handle it.

Third Embodiment

Figure 9:
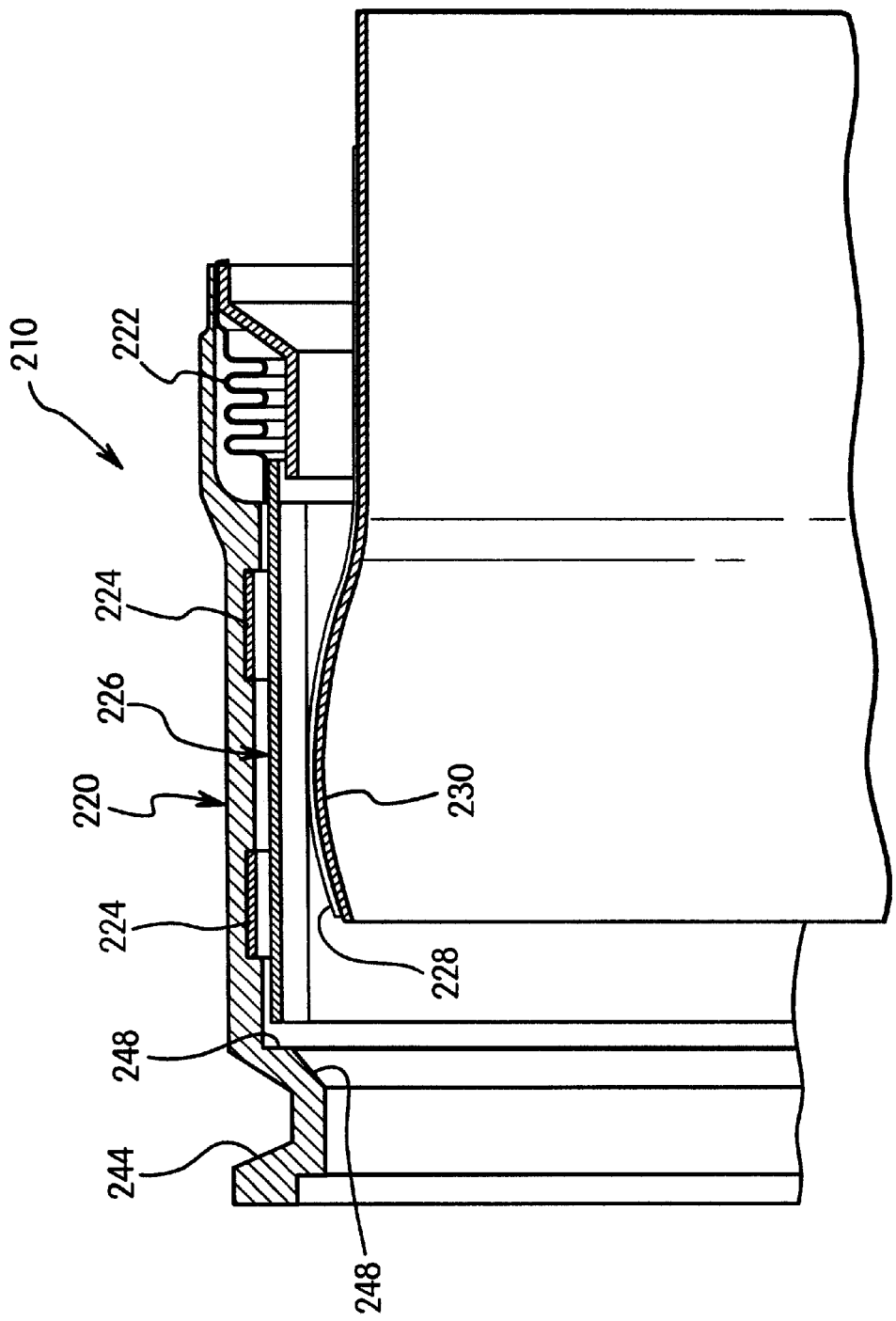
FIG. 9 is an enlarged longitudinal cross sectional view of a flexible slide joint in accordance with a third embodiment of the present invention.

Referring now to FIG. 9, a flexible slide joint 210 is illustrated in accordance with a third embodiment of the present invention. Basically, the second and third embodiments are identical, except that the mounting structure has been modified in this third embodiment as explained below. Specifically, the flexible slide joint 210 includes a modified tube adapter 220 designed to be fixedly secured to an alternate first fluid conveying member (not shown). The remaining parts of the flexible slide joint 210 are identical to the second embodiment. In view of the similarity between the second and third embodiments, the parts of the third embodiment that are identical to the parts of the second embodiment will be given the same reference numerals as the parts of the second embodiment, but increased by one hundred. Moreover, the descriptions of the parts of the third embodiment that are identical to the parts of the second embodiment may be omitted for the sake of brevity. In other words, the following description will focus on the differences between the second and third embodiments.

Similar to the second embodiment, the flexible slide joint 210 basically includes a tube adapter (first tube member) 220, a bellows 222, a pair of guide elements 224, a sealing sleeve 226, a sealing tube 228 and a sealing tube liner (second tube member) 230. As mentioned above, the parts of the flexible slide joint 210 are identical to the parts of the flexible slide joint 110, except for the tube adapter 220. Specifically, the tube adapter 220 includes a "V" flange adapter 244 integrally formed at one end such that the flexible slide joint 210 can be coupled to an alternate first fluid conveying member (not shown) from the second embodiment via a clamp (not shown) in a conventional manner. In other words, the "V" flange adapter 244 replaces the mounting flange 144 of the second embodiment. The "V" flange adapter 244 has a modified stop flange 248 with a first axial stop or abutment surface 248a integrally formed therewith that replaces the annular stop flange 148 of the second embodiment. Thus, the flexible slide joint 210 functions in a manner identical to the second embodiment.

Alternatively, the flexible slide joint 210 can have a modified tube adapter, instead of tube adapter 220, which is designed to be fixedly secured to an alternate first fluid conveying member (not shown) by welding.

Fourth Embodiment

Figure 10:
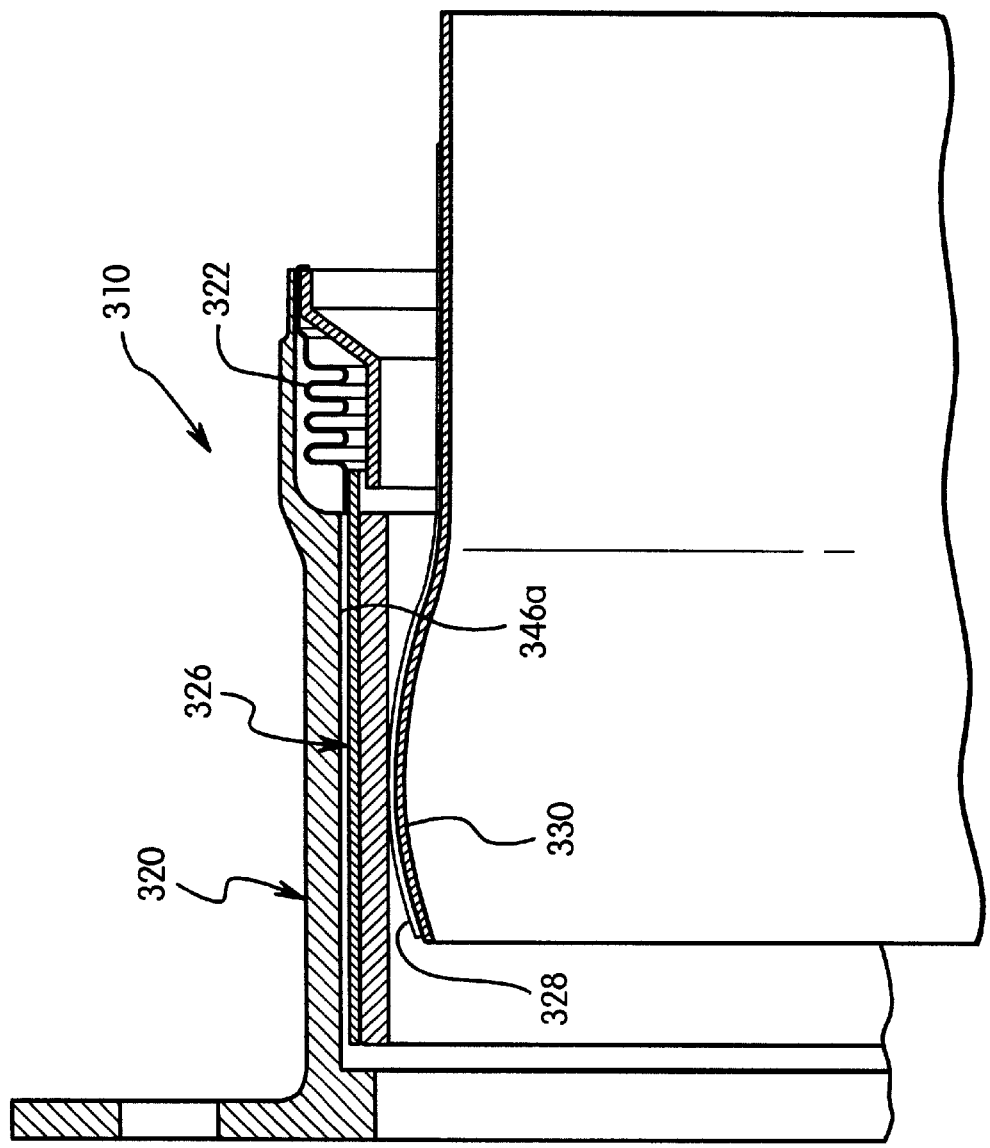
FIG. 10 is an enlarged longitudinal cross sectional view of a flexible slide joint in accordance with a fourth embodiment of the present invention.

Referring now to FIG. 10, a flexible slide joint 310 is illustrated in accordance with a fourth embodiment of the present invention. Basically, the second and fourth embodiments are identical, except that the guiding structure has been modified in this fourth embodiment as explained below. Specifically, the flexible slide joint 310 utilizes a clearance type guide structure (i.e. a modified tube adapter) rather than the guide elements 124 of the second embodiment. The remaining parts of the flexible slide joint 310 are identical to the second embodiment. In view of the similarity between the second and fourth embodiments, the parts of the fourth embodiment that are identical to the parts of the second embodiment will be given the same reference numerals as the parts of the second embodiment, but increased by two hundred. Moreover, the descriptions of the parts of the fourth embodiment that are identical to the parts of the second embodiment may be omitted for the sake of brevity. In other words, the following description will focus on the differences between the second and fourth embodiments.

Similar to the second embodiment, the flexible slide joint 310 basically includes a tube adapter (first tube member) 320, a bellows 322, a sealing sleeve 326, a sealing tube 328 and a sealing tube liner (second tube member) 330. Since the guide elements 124 of the second embodiment have been removed, the tube adapter 320 has been slightly modified to create a clearance type guide structure. Specifically, the cylindrical surface 346a of the tube adapter 320 preferably has a constant diameter (i.e. the grooves 146c and guide elements 124 of the second embodiment have been eliminated). Thus, the outer annular surface of the sealing sleeve 326 has limited clearance within the tube adapter 320 to form the clearance type guide structure. This arrangement allows limited transverse movement of portions of the flexible slide joint 310 and eliminates parts and manufacturing steps (i.e. a simplified structure is obtained). Thus, the flexible slide joint 310 functions in a manner substantially identical to the second embodiment.

Fifth Embodiment

Figure 11:
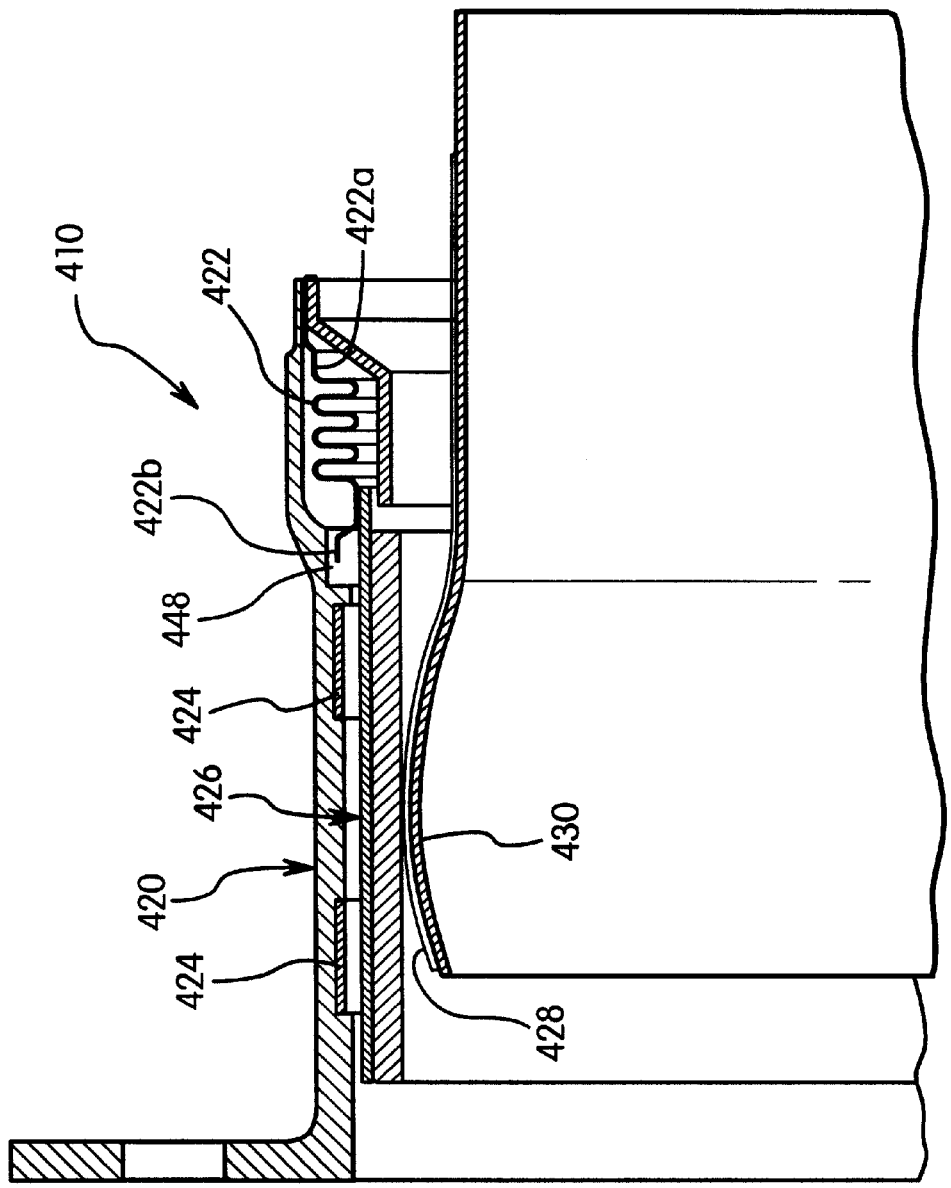
FIG. 11 is an enlarged longitudinal cross sectional view of a flexible slide joint in accordance with a fifth embodiment of the present invention.

Referring now to FIG. 11, a flexible slide joint 410 is illustrated in accordance with a fifth embodiment of the present invention. Basically, the second and fifth embodiments are identical, except that the structure for stopping axial movement has been modified in this fifth embodiment as explained below. Specifically, the flexible slide joint 410 has a modified first stop. More specifically, the flexible slide joint 410 includes a modified tube adapter 420 and a modified bellows 422 to form the modified first stop. The remaining parts of the flexible slide joint 410 are identical to the second embodiment. In view of the similarity between the second and fifth embodiments, the parts of the fifth embodiment that are identical to the parts of the second embodiment will be given the same reference numerals as the parts of the second embodiment, but increased by three hundred. Moreover, the descriptions of the parts of the fifth embodiment that are identical to the parts of the second embodiment may be omitted for the sake of brevity. In other words, the following description will focus on the differences between the second and fifth embodiments.

Similar to the second embodiment, the flexible slide joint 410 basically includes a tube adapter (first tube member) 420, a bellows 422, a pair of guide elements 424, a sealing sleeve 426, a sealing tube 428 and a sealing tube liner (second tube member) 430. As mentioned above, the parts of the flexible slide joint 410 are identical to the parts of the flexible slide joint 110, except for the tube adapter 420 and the bellows 422. Specifically, the tube adapter 420 has an annular stop recess 448 formed therein that is adjacent to the bellows 422 to form a part of the first stop. The annular stop flange 148 of the second embodiment has been removed in this fifth embodiment. The bellows 422 has a first end 422a and a second end 422b that forms a stop portion. The stop portion 422b of the bellows 422 is arranged to selectively contact the annular stop recess 448 of the tube adapter 420 to form the first stop. Thus, the flexible slide joint 410 functions in a manner identical to the second embodiment.

Sixth Embodiment

Figure 12:
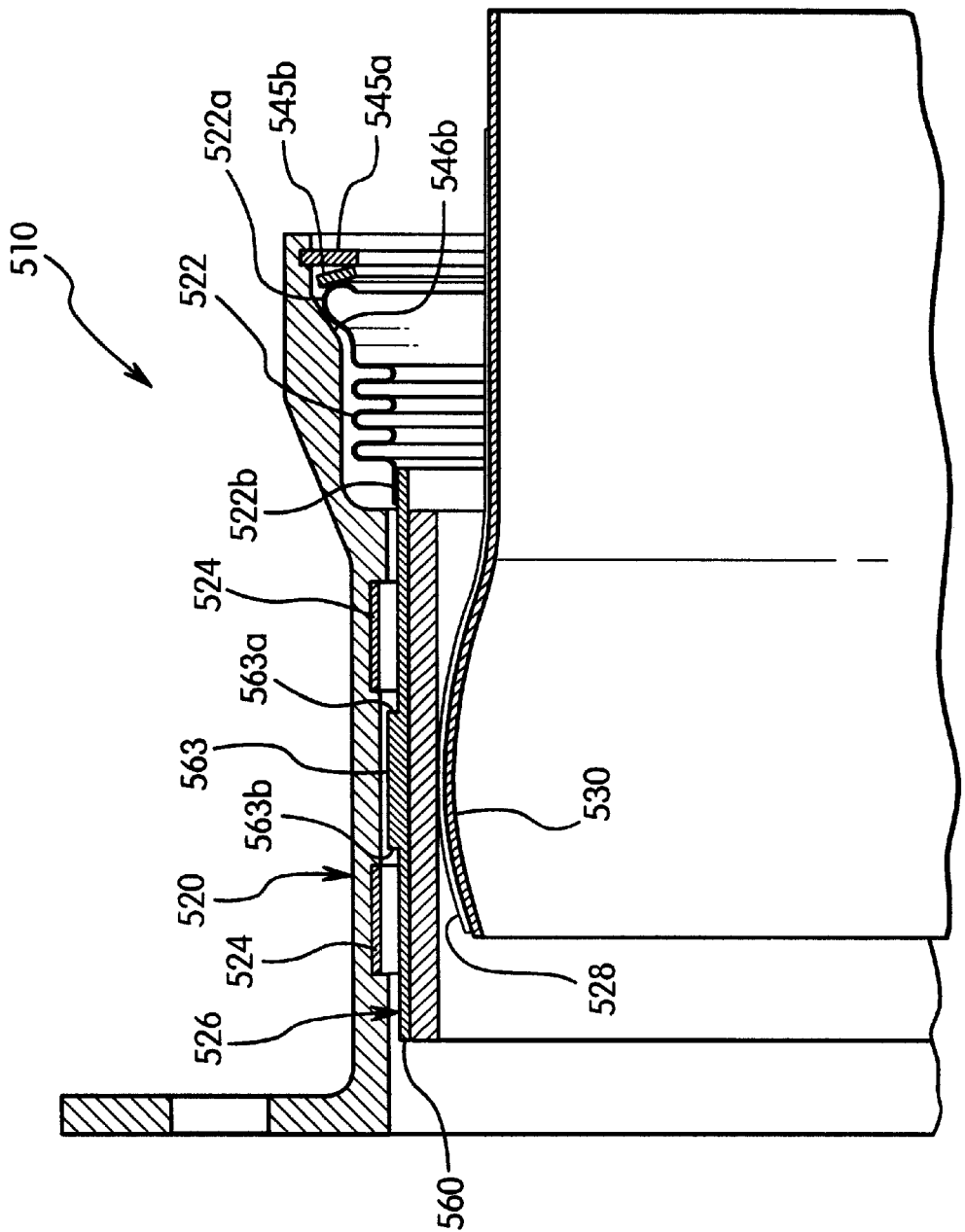
FIG. 12 is an enlarged longitudinal cross sectional view of a flexible slide joint in accordance with a sixth embodiment of the present invention.

Referring now to FIG. 12, a flexible slide joint 510 is illustrated in accordance with a sixth embodiment of the present invention. Basically, the second and sixth embodiments are identical, except that that the structure for stopping axial movement and the connection between the bellows 522 and the tube adapter 520 have been modified in this sixth embodiment as explained below. In view of the similarity between the second and sixth embodiments, the parts of the sixth embodiment that are identical to the parts of the second embodiment will be given the same reference numerals as the parts of the second embodiment, but increased by four hundred. Moreover, the descriptions of the parts of the sixth embodiment that are identical to the parts of the second embodiment may be omitted for the sake of brevity.

Similar to the second embodiment, the flexible slide joint 510 basically includes a tube adapter (first tube member) 520, a bellows 522, a pair of guide elements 524, a sealing sleeve 526, a sealing tube 528 and a sealing tube liner (second tube member) 530. In this embodiment, the first end 522a of the bellows 522 is coupled to the tube adapter 520 via a split ring 545a and a conical washer or spring 545b. More specifically, the first end 522a of the bellows 522 is curved so as to be sandwiched against the conical surface of the inner surface 546b of the tube adapter 520 by coupling arrangement of the slit ring 545a and the conical washer or spring 545b. The second end 522b of the bellows 522 is welded to the support member 560 of the sealing sleeve 526.

Also, in this embodiment, the support member 560 of the sealing sleeve 526 includes an annular flange 563 on the outer surface of the support member 560 that forms a pair of axial stop surfaces 563a and 563b. The guide elements 524 contact the of axial stop surfaces 563a and 563b of the support member 560 to limit axial movement of the sealing sleeve 526 and the bellows 522.

Seventh Embodiment

Figure 13:
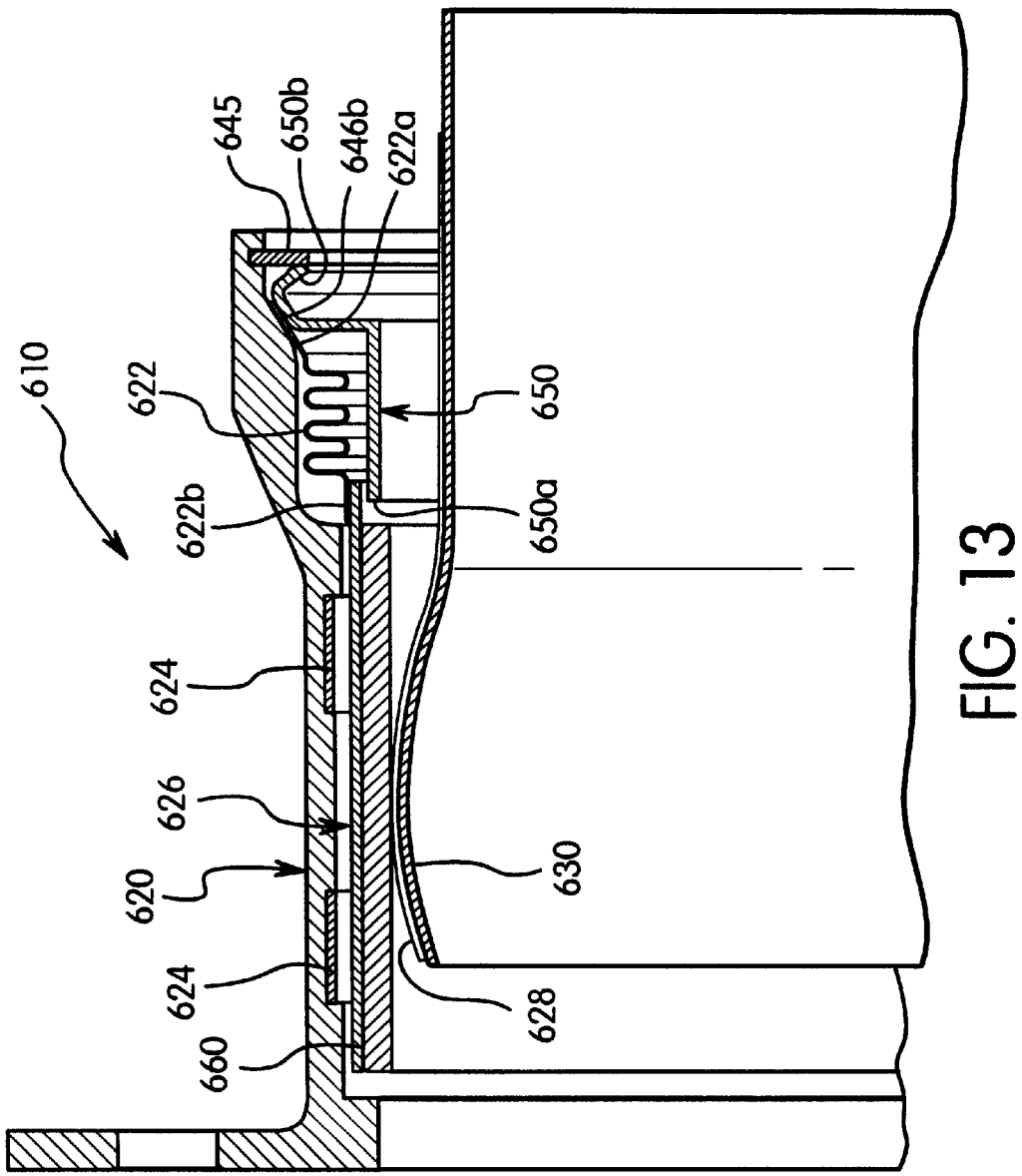
FIG. 13 is an enlarged longitudinal cross sectional view of a flexible slide joint in accordance with a seventh embodiment of the present invention.

Referring now to FIG. 13, a flexible slide joint 610 is illustrated in accordance with a seventh embodiment of the present invention. Basically, the second and seventh embodiments are identical, except that the connection between the bellows 622 and the tube adapter 620 has been modified in this seventh embodiment as explained below. In view of the similarity between the second and seventh embodiments, the parts of the seventh embodiment that are identical to the parts of the second embodiment will be given the same reference numerals as the parts of the second embodiment, but increased by five hundred. Moreover, the descriptions of the parts of the seventh embodiment that are identical to the parts of the second embodiment may be omitted for the sake of brevity.

Similar to the second embodiment, the flexible slide joint 610 basically includes a tube adapter (first tube member) 620, a bellows 622, a pair of guide elements 624, a sealing sleeve 626, a sealing tube 628 and a sealing tube liner (second tube member) 630. In this embodiment, the first end 622a of the bellows 622 is coupled to the tube adapter 620 via a split ring 645 and a tubular stop element 650. More specifically, the tubular stop element 650 has a first end 650a that forms a stop and a second V-shaped end 650b that clamps the first end 622a of the bellows 622 to the tube adapter 620 via the slit ring 645. In other words, the first end 622a of the bellows 622 is sandwiched between the conical surface of the inner surface 646b of the tube adapter 520 and the V-shaped end 650b. The V-shaped end 650b of the tubular stop element 650 is resilient in the axial direction so that the V-shaped end 650b is axially compressed when the slit ring 645 is installed in the annular groove of the tube adapter 620. The second end 622b of the bellows 622 is welded to the support member 660 of the sealing sleeve 626.

Eighth Embodiment

Figure 14:
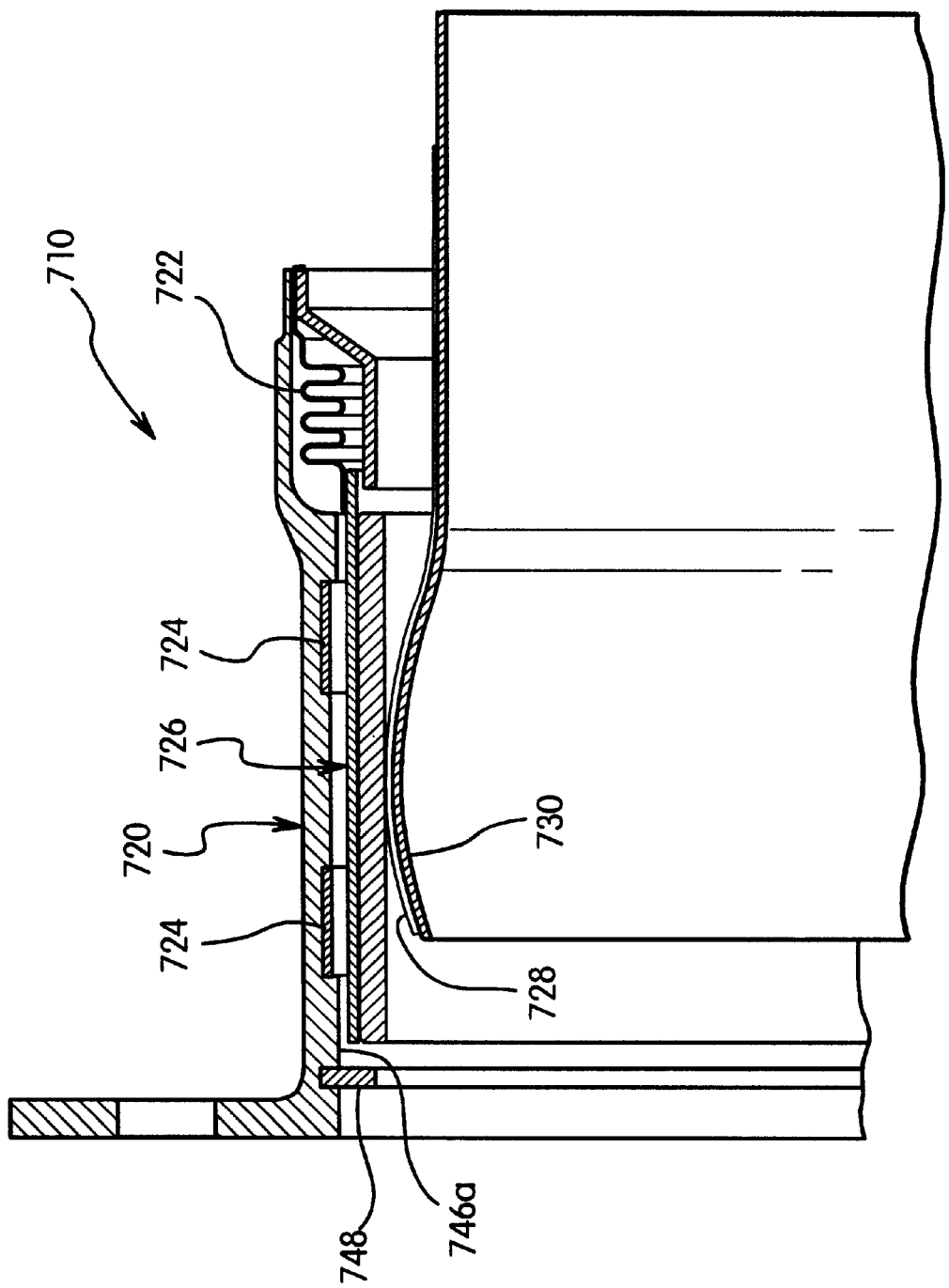
FIG. 14 is an enlarged longitudinal cross sectional view of a flexible slide joint in accordance with an eighth embodiment of the present invention.

Referring now to FIG. 14, a flexible slide joint 710 is illustrated in accordance with an eighth embodiment of the present invention. Basically, the second and eighth embodiments are identical, except that the tube adapter 720 has been modified in this eighth embodiment as explained below. In view of the similarity between the second and eighth embodiments, the parts of the eighth embodiment that are identical to the parts of the second embodiment will be given the same reference numerals as the parts of the second embodiment, but increased by six hundred. Moreover, the descriptions of the parts of the eighth embodiment that are identical to the parts of the second embodiment may be omitted for the sake of brevity.

Similar to the second embodiment, the flexible slide joint 710 basically includes a tube adapter (first tube member) 720, a bellows 722, a pair of guide elements 724, a sealing sleeve 726, a sealing tube 728 and a sealing tube liner (second tube member) 730. In this embodiment, a split ring 748 is secured to the inner surface 746a of the tube adapter 720 instead of having an integral flange 148 as in the second embodiment.

Ninth Embodiment

Figure 15:
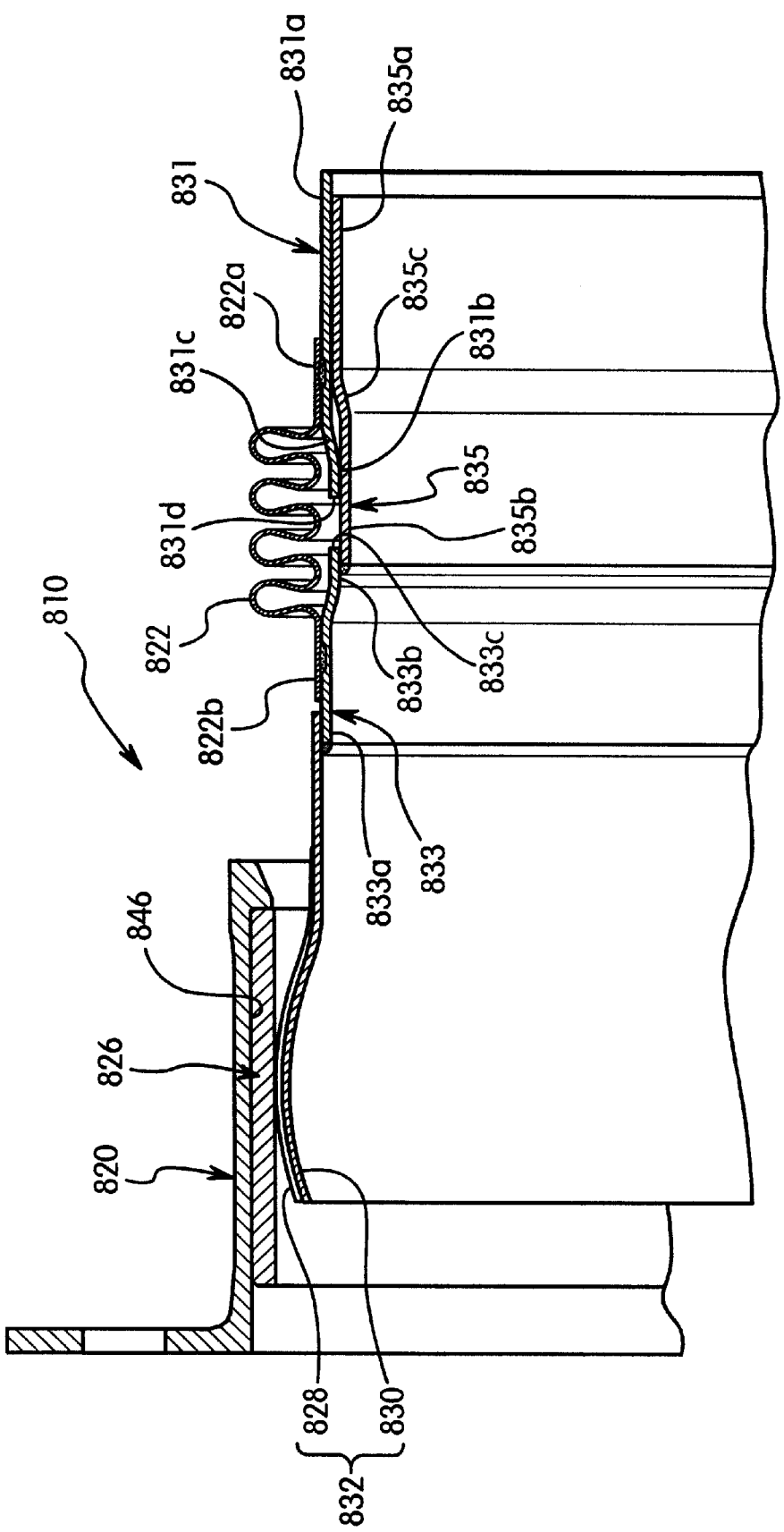
FIG. 15 is an enlarged longitudinal cross sectional view of a flexible slide joint in accordance with a ninth embodiment of the present invention.

Referring now to FIG. 15, a flexible slide joint 810 is illustrated in accordance with a ninth embodiment of the present invention. Basically, the second and ninth embodiments employ the same principles, discussed above. However, this ninth embodiment differs from the second embodiment in the arrangement of the bellows 822, the sealing sleeve 826, the sealing tube 828, and the sealing tube liner 830. In view of the similarity between the second and ninth embodiments, the parts of the ninth embodiment that are substantially identical to the parts of the second embodiment will be given the same reference numerals as the parts of the second embodiment, but increased by seven hundred. Moreover, the descriptions of the parts of the ninth embodiment that are substantially identical to the parts of the second embodiment may be omitted for the sake of brevity.

Similar to the second embodiment, the flexible slide joint 810 basically includes a tube adapter (first tube member) 820, a bellows 822, a sealing sleeve 826, a sealing tube 828, a sealing tube liner (second tube member) 830, and three tubular members 831, 833 and 835. The flexible slide joint 810 can be installed between the first and second fluid conveying members via bolts or welding as shown in the prior embodiments. Thus, in this embodiment, the bellows 822 is located between the second fluid conveying member 14 and the tube seal 828. Accordingly, the sealing sleeve 826 is fixed to the inner surface 846 of the tubular adapter 820.

A first tubular member 831 is fixed to a first end 822a of the bellows 822, by welding, while a second tubular member 833 is fixed to a second end 822b of the bellows 822 by welding. A third tubular member 835 is fixed to the second tubular member 833 by welding, and slideably supports the inner surface of the first tubular member 831. A lubricant is preferably applied between the inner surface of the first tubular member 831 and the outer surface of the third tubular member 835.

The first tubular member 831 has a first cylindrical end portion 831a that is welded to the tube or fluid conveying member 14 by welding, a second cylindrical end portion 831b that has a smaller diameter than the first cylindrical end portion 831a and a transition portion 831c. The transition portion 831c is formed between the first and second cylindrical end portions 831a and 831b and acts as an axial stop or abutment that contacts the third tubular member 835. An end surface 831d of the first tubular member 831 also acts as an axial stop.

The second tubular member 833 has a first cylindrical end portion 833a that is welded to the sealing tube liner 830, and a second cylindrical end portion 833b that is welded to the third tubular member 835. The second cylindrical end portion 833b has a smaller diameter than the first cylindrical end portion 833a. An end surface 833c of the second tubular member 833 acts as an axial stop or abutment that contacts the end surface or stop 83 Id of the first tubular member 831.

The third tubular member 835 has a first cylindrical end portion 835a that supports the inner surface of the first cylindrical end portion 831a of the first tubular member 831, and a second cylindrical end portion 835b that is welded to the second cylindrical end portion 833b of the second tubular member 833. The second cylindrical end portion 835b has a smaller diameter than the first cylindrical end portion 835a to form a transition portion 835c between the first and second cylindrical end portions 835a and 835b. The transition portion 835c is arranged to contact the transition portion 831c of the first tubular member 831. Thus, the transition portion 835c acts as an axial stop or abutment that limits axial movement of the bellows 822. The second cylindrical end portion 835b supports the inner surface of the second cylindrical end portion 831b of the first tubular member 831. Thus, the first tubular member 831 slides on the third tubular member 835 to prevent angulation of the bellows 822. Thus, the first, second and third tubular members 831, 833 and 835 are arranged to limit or control the axial movement (expansion and contraction) of the bellows 822, while also preventing angulation of the bellows 822. Specifically, the end surface or stops 831d and 833c limit contraction of the bellows 822, while the transition portions 831c and 835c limit expansion of the bellows 822. The first, second and third tubular members 831, 833 and 835 cooperate to limit the amount of angular freedom across the bellows 822 to prevent the sliding sealing member 832 from cycling in angulation in the sleeve 826 and causing it to wear out when there is lateral vibration.

Similar to the prior embodiments, the flexible slide joint 810 of this ninth embodiment of the present invention requires a force balance between the force to slide of the sliding sealing member 832 and the force to compress the bellows 822. It is necessary for the sliding force of the sliding sealing member 832 to be stiffer than the deflection force of the bellows 822 over the range of motion where vibration effects are to be eliminated. The sliding sealing member 832 takes some vibration motion but the intent is to eliminate with the bellows 822 as much vibration motion as possible.

The flexible slide joint 810 also requires a force balance between the pressure end "plug" load of the sliding sealing member 832 and the pressure end "plug" load of the bellows 822. If the plug loads are not balanced, then the bellows 822 will move by some amount. If it moves too far, then it can bottom its stops, or, if stops are not adequate then the sliding sealing member 832 could unplug from the tube adapter 820. If the bellows 822 bottoms out then it cannot move to accommodate vibration movement.

Tenth Embodiment

Figure 16:
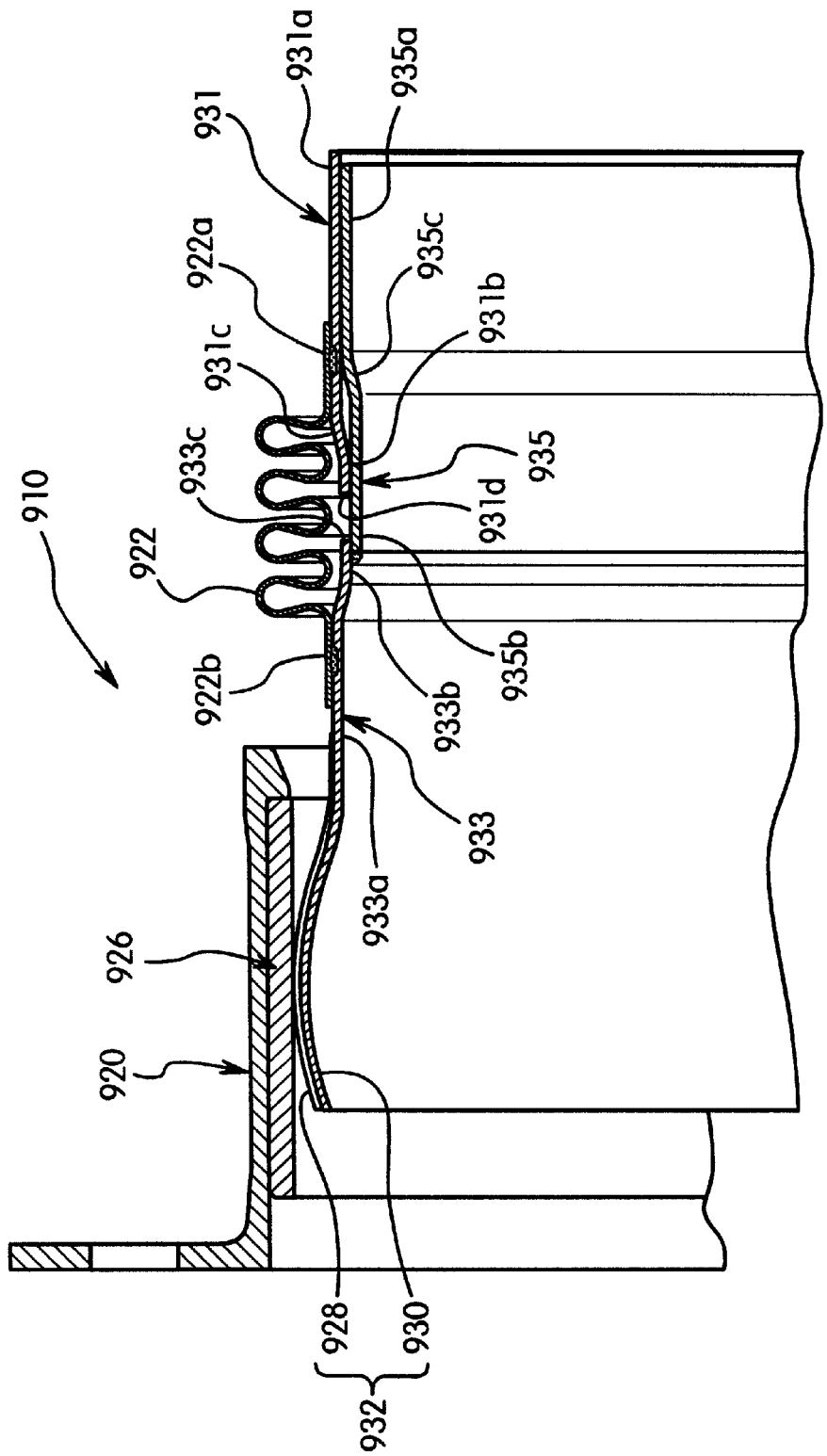
FIG. 16 is an enlarged longitudinal cross sectional view of a flexible slide joint in accordance with a tenth embodiment of the present invention.

Referring now to FIG. 16, a flexible slide joint 910 is illustrated in accordance with a tenth embodiment of the present invention. Basically, the ninth and tenth embodiments are identical, except that the tubular member 833 has been eliminated in this tenth embodiment as explained below. In view of the similarity between the ninth and tenth embodiments, the parts of the tenth embodiment that are identical to the parts of the ninth embodiment will be given the same reference numerals as the parts of the ninth embodiment, but increased by one hundred. Moreover, the descriptions of the parts of the tenth embodiment that are identical to the parts of the ninth embodiment may be omitted for the sake of brevity.

Similar to the ninth embodiment, the flexible slide joint 910 basically includes a tube adapter (first tube member) 920, a bellows 922, a sealing sleeve 926, a sealing tube 928 and a sealing tube liner (second tube member) 930. Here, a first tubular member 931 is fixed to a first end 922a of the bellows 922, by welding, while the second end 922b of the bellows 922 is fixed directly to tubular end 933 of the sealing tube liner 930 by welding. Thus, the tubular end 933 forms a second tubular member. A third tubular member 935 is fixed to the second tubular member 933 by welding, and slideably supports the inner surface of the first tubular member 931.

The first tubular member 931 has a first cylindrical end portion 931a that is welded to the tube or fluid conveying member 14 by welding, a second cylindrical end portion 931b that has a smaller diameter than the first cylindrical end portion 931a and a transition portion 931c. The transition portion 931c is formed between the first and second cylindrical end portions 931a and 931b and acts as an axial stop or abutment that contacts the third tubular member 935. An end surface 931d of the first tubular member 931 also acts as an axial stop.

The second tubular member 933 has a first cylindrical end portion 933a that is integrally formed with the sealing tube liner 930, and a second cylindrical end portion 933b that is welded to the third tubular member 935. The second cylindrical end portion 933b has a smaller diameter that the first cylindrical end portion 933a. An end surface 933c of the second tubular member 933 acts as an axial stop or abutment that contacts the end surface or stop 931d of the first tubular member 931.

The third tubular member 935 has a first cylindrical end portion 935a that supports the inner surface of the first cylindrical end portion 931a of the first tubular member 931, and a second cylindrical end portion 935b that is welded to the second cylindrical end portion 933b of the second tubular member 933. The second cylindrical end portion 935b has a smaller diameter than the first cylindrical end portion 935a to form a transition portion 935c between the first and second cylindrical end portions 935a and 935b. The transition portion 935c is arranged to contact the transition portion 931c of the first tubular member 931. Thus, the transition portion 935c acts as an axial stop or abutment that limits axial movement of the bellows 922. The second cylindrical end portion 935b supports the inner surface of the second cylindrical end portion 931b of the first tubular member 931. Thus, the first tubular member 931 slides on the third tubular member 935 to prevent angulation of the bellows 922. Thus, the first, second and third tubular members 931, 933 and 935 are arranged to limit or control the axial movement (expansion and contraction) of the bellows 922, while also preventing angulation of the bellows 922. Specifically, the end surface or stops 931d and 933c limit contraction of the bellows 922, while the transition portions 931c and 935c limit expansion of the bellows 922.

Eleventh Embodiment

Figure 17:
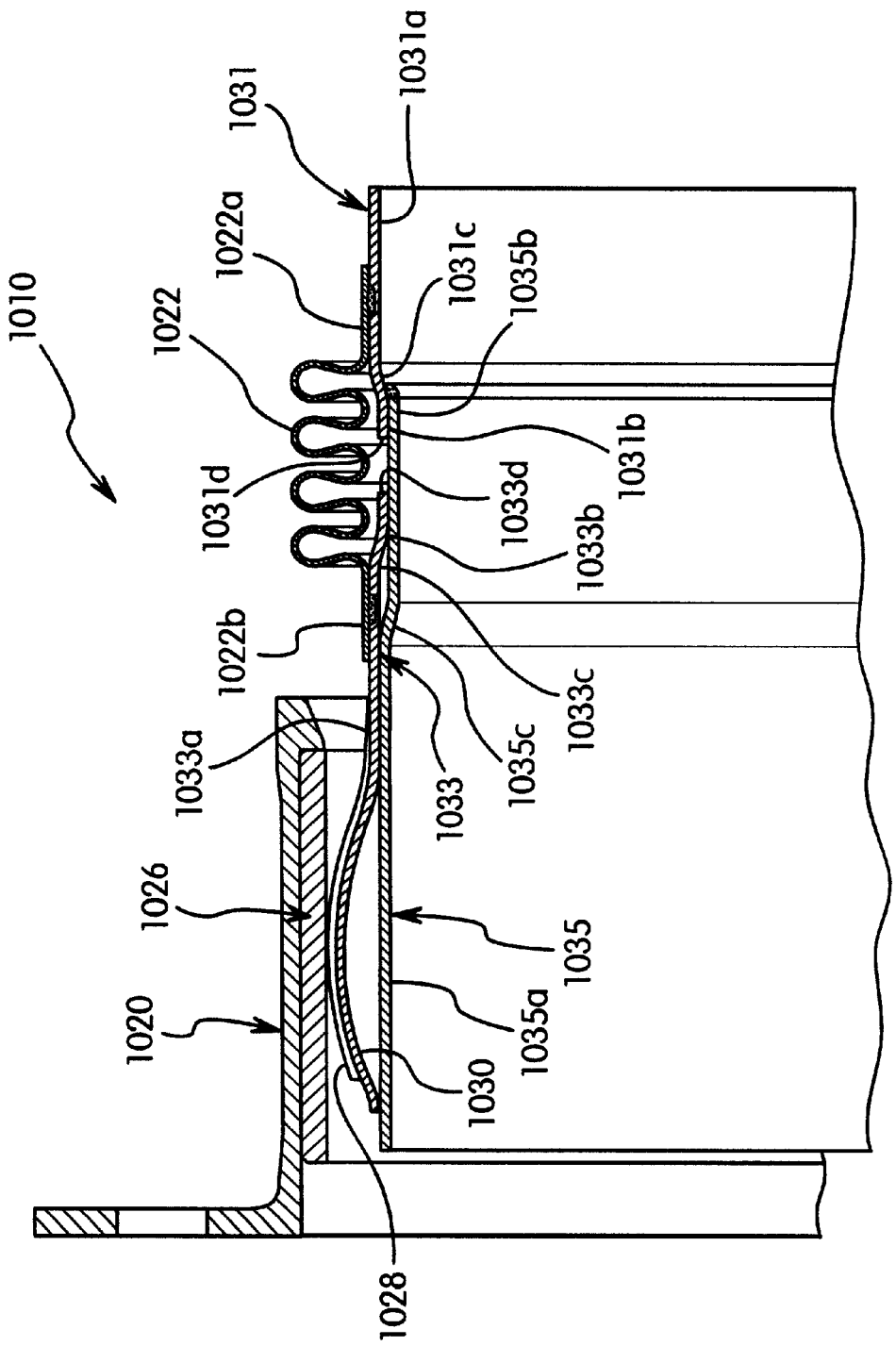
FIG. 17 is an enlarged longitudinal cross sectional view of a flexible slide joint in accordance with an eleventh embodiment of the present invention.

Referring now to FIG. 17, a flexible slide joint 1010 is illustrated in accordance with an eleventh embodiment of the present invention. Basically, the ninth and eleventh embodiments are identical, except that the tubular member 833 has been eliminated in this eleventh embodiment and the tubular member 835 has been reversed in this eleventh embodiment as explained below. Of course, there are some other changes as explained below. The third tubular member 1035 extends completely through the sealing tube liner 1030 and cooperates with the free end of the sealing tube liner 1032 to form a guide surface at its end. In view of the similarity between the ninth and eleventh embodiments, the parts of the eleventh embodiment that are identical to the parts of the ninth embodiment will be given the same reference numerals as the parts of the ninth embodiment, but increased by two hundred. Moreover, the descriptions of the parts of the eleventh embodiment that are identical to the parts of the ninth embodiment may be omitted for the sake of brevity.

Similar to the ninth embodiment, the flexible slide joint 1010 basically includes a tube adapter (first tube member) 1020, a bellows 1022, a sealing sleeve 1026, a sealing tube 1028, a sealing tube liner 1030 with an integral tubular member 1033 (second tube member) and two additional tubular members 1031 and 1035. Here, a first tubular member 1031 is fixed to a first end 1022a of the bellows 1022, by welding, while the second end 1022b of the bellows 1022 is fixed directly to tubular end 1033 of the sealing tube liner 1030 by welding. Thus, the tubular member 1033, which is one of the ends of the sealing tube line 1030, forms a second tubular member. A third tubular member 1035 is fixed to the first tubular member 1031 by welding, and slideably supports the inner surface of the second tubular member 1033 which is part of the sealing tube liner 1030.

The first tubular member 1031 has a first cylindrical end portion 1031a that is welded to the tube or fluid conveying member 14 by welding, a second cylindrical end portion 1031b that has a smaller diameter than the first cylindrical end portion 1031a and a transition portion 1031c. The transition portion 1031c is formed between the first and second cylindrical end portions 1031a and 1031b. An end surface 1031d of the first tubular member 1031 acts as an axial stop.

The second tubular member 1033 has a first cylindrical end portion 1033a that is the main cylindrical portion of the sealing tube liner 1030, and a second cylindrical end portion 1033b that is the free end of the sealing tube liner 1030. The second cylindrical end portion 1033b slides along the third tubular member 1035. The second cylindrical end portion 1033b has a smaller diameter that the first cylindrical end portion 1033a to form a transition portion 1033c that acts as an axial stop or abutment for limiting axial movement of the bellows 1022. An end surface 1033d of the second tubular member 1033 also acts as an axial stop or abutment that contacts the end surface or stop 1031d of the first tubular member 1031.

The third tubular member 1035 has a first cylindrical end portion 1035a that slideably supports the inner surface of the first cylindrical end portion 1033a of the second tubular member 1033, and a second cylindrical end portion 1035b that is welded to the second cylindrical end portion 1031b of the first tubular member 1031. The third tubular member 1035 extends completely through the sealing tube liner 1030 and cooperates with the free end of the sealing tube liner 1032 to form a guide surface at its end. The second cylindrical end portion 1035b has a smaller diameter than the first cylindrical end portion 1035a to form a transition portion 1035c between the first and second cylindrical end portions 1035a and 1035b. The transition portion 1035c is arranged to contact the transition portion 1033c of the second tubular member 1033. Thus, the transition portion 1035c acts as an axial stop or abutment that limits axial movement of the bellows 1022. The second cylindrical end portion 1035b supports the inner surface of the second cylindrical end portion 1033b of the second-tubular member 1033. Thus, the second tubular member 1033 slides on the third tubular member 1035 to prevent angulation of the bellows 1022. Thus, the first, second and third tubular members 1031, 1033 and 1035 are arranged to limit or control the axial movement (expansion and contraction) of the bellows 1022, while also preventing angulation of the bellows 1022. Specifically, the end surface or stops 1031d and 1033c limit contraction of the bellows 1022, while the transition portions 1031c and 1035c limit expansion of the bellows 1022.

Terminology Used in the Prior Embodiments

As used herein, the phrase "interference fit" means that with the sealing member or element curved surface having a slightly different free diameter prior to installation from the diameter of the cylindrical surface and with the curved surface being resilient, on forcing the curved surface into or around the cylindrical surface the sealing member or element will be elastically deformed and thus maintained in intimate circumferential contact with the cylindrical surface due to the reactive force of the elastic deformation.

As used herein, the phrase "free diameter" means the diameter of the ring portion curved surface prior to installation with the cylindrical surface, and therefore prior to its elastic deformation, either compression or expansion.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A flexible slide joint comprising:

a first tube member having a first center axis;

a second tube member having a second center axis;

a slideable sealing assembly configured and arranged between said first and second tube members to accommodate a first range of axial movement between said first and second tube members upon a first predetermined axial force occurring between said first and second tube members; and an axially compressible element configured and arranged between said first and second tube members to accommodate a second range of axial movement between said first and second tube members upon a second predetermined axial force occurring between said first and second tube members, said axially compressible element being force balanced relative to said slidable sealing assembly such that said second predetermined axial force is smaller than said first predetermined axial force, said axially compressible element being configured and arranged to operate in series with said slidable sealing assembly.

2. The flexible slide joint according to claim 1, wherein said slideable sealing assembly includes a sealing sleeve coupled to said first tube member and a sealing tube coupled to said second tube member, said sealing sleeve having an annular inner contact surface slideably contacting an outer contact surface of said sealing tube.

3. The flexible slide joint according to claim 2, wherein said axially compressible element is located at a first end of said first tube member and at a second end of said sealing sleeve such that said sealing sleeve slides axially relative to said first tube member.

4. The flexible slide joint according to claim 2, wherein said axially compressible element is located radially outward relative to said sealing tube.

5. The flexible slide joint according to claim 2, wherein said sealing tube has a resilient spherical portion that contacts said sealing sleeve to angulate said resilient sealing tube relative to said sealing sleeve.

6. The flexible slide joint according to claim 2, wherein said sealing sleeve is fixedly coupled to an inner surface of said first tube member, and
said sealing tube has a first end portion with said outer contact surface contacting said inner contact surface of said sealing sleeve and a second end portion coupled to said second tube member with said axially compressible element operatively disposed between said second end portion and said second tube member.

7. The flexible slide joint according to claim 6, wherein said axially compressible element has a first end fixedly coupled to said second tube member and a second end fixedly coupled to said second end portion of said sealing tube with a support tube fixedly coupled to one of said second tube member and said sealing tube and slideably coupled to the other of said second tube member and said sealing tube.

8. The flexible slide joint according to claim 7, wherein said second tube member, said sealing tube and said support tube are configured and arranged to form a pair of first axial stops and a pair of second axial stops that cooperate to limit axial movement of said axially compressible element within a predetermined range.

9. The flexible slide joint according to claim 8, wherein said sealing tube has a tubular member coupled thereto, said tubular member is configured and arranged to couple said sealing tube to said axially compressible element.

10. The flexible slide joint according to claim 9, wherein said sealing tube has a resilient spherical portion that contacts said sealing sleeve to angulate said resilient sealing tube relative to said sealing sleeve, and a sealing tube liner coupling said sealing tube to said tubular member.

11. The flexible slide joint according to claim 9, wherein said sealing tube has a resilient spherical portion that contacts said sealing sleeve to angulate said resilient sealing tube relative to said sealing sleeve.

12. The flexible slide joint according to claim 1, wherein said slideable sealing assembly is configured and arranged between said first and second tube members to accommodate angular movement between said first and second center axes upon a predetermined angular force occurring between said first and second tube members.

13. The flexible slide joint according to claim 1, wherein said axially compressible element is a removable sealing ring having a first sealing end and a second sealing end.

14. The flexible slide joint according to claim 13, wherein said sealing ring has multiple convolutions between said first sealing end and said second sealing end.

15. The flexible slide joint according to claim 14, wherein said sealing ring is configured and arranged relative said first and second tube members such that said sealing ring is arranged to be pressure energized.

16. The flexible slide joint according to claim 1, wherein said axially compressible element is a bellows with multiple convolutions.

17. A flexible slide joint comprising:
a first tube member having a first center axis;
a second tube member having a second center axis;
a slideable sealing assembly configured and arranged between said first and second tube members to accommodate a first range of axial movement between said first and second tube members upon a first predetermined axial force occurring between said first and second tube members, said slideable sealing assembly including a sealing sleeve coupled to said first tube member and a sealing tube coupled to said second tube member, said sealing sleeve having an annular inner contact surface slideably contacting an outer contact surface of said sealing tube, said sealing sleeve being slideably supported on said first tube member by at least one guide element; and
an axially compressible element configured and arranged between said first and second tube members to accommodate a second range of axial movement between said first and second tube members upon a second predetermined axial force occurring between said first and second tube members, said axially compressible element being force balanced relative to said slidable sealing assembly such that said second predetermined axial force is smaller than said first predetermined axial force.

18. A flexible slide joint comprising:
a first tube member having a first center axis;
a second tube member having a second center axis;
a slideable sealing assembly configured and arranged between said first and second tube members to accommodate a first range of axial movement between said first and second tube members upon a first predetermined axial force occurring between said first and second tube members, said slideable sealing assembly including a sealing sleeve coupled to said first tube member and a sealing tube coupled to said second tube member, said sealing sleeve having an annular inner contact surface slideably contacting an outer contact surface of said sealing tube; and
an axially compressible element configured and arranged between said first and second tube members to accommodate a second range of axial movement between said first and second tube members upon a second predetermined axial force occurring between said first and second tube members, said axially compressible element being located at a first end of said first tube member and at a second end of said sealing sleeve such that said sealing sleeve slides axially relative to said first tube member, said axially compressible element being force balanced relative to said slidable sealing assembly such that said second predetermined axial force is smaller than said first predetermined axial force, said first tube member, said sealing sleeve and said axially compressible element being configured and arranged to form a pair of first axial stops and a pair of second axial stops that cooperate to limit axial movement of said sealing sleeve within a predetermined range.

19. The flexible slide joint according to claim 18, wherein said first axial stops are formed at opposite ends of said first tube member and said second axial stops are formed at opposite ends of said sealing sleeve.

20. The flexible slide joint according to claim 19, wherein at least one of said axial stops is integrally formed as a one-piece, unitary part of a tubular portion of said first tube member that slideably supports said sealing sleeve.

21. The flexible slide joint according to claim 19, wherein at least one of said first of said axial stops is a separate piece that is fixedly coupled to said first tube member.

22. The flexible slide joint according to claim 18, wherein at least one of said axial stops is integrally formed as a one-piece, unitary part of a tubular portion of said first tube member that slideably supports said sealing sleeve.

23. The flexible slide joint according to claim 18, wherein at least one of said first of said axial stops is a separate piece that is fixedly coupled to said first tube member.

24. The flexible slide joint according to claim 18, wherein one of said first of said axial stops is formed by an end of said axially compressible element.

25. The flexible slide joint according to claim 18, wherein one of said first tube member and said sealing sleeve has a pair of guide elements coupled thereto and the other of said first tube member and said sealing sleeve has a stop member coupled thereto such that said first axial stops are formed by said guide elements and said second axial stops are formed by said stop member.

26. A flexible slide joint comprising:

first attachment means for coupling to a first tube;

second attachment means for coupling to a second tube;

first sealing means for accommodating a first range of axial movement between said first and second attachment means upon a first predetermined axial force occurring between said first and second attachment means; and second sealing means for accommodating a second range of axial movement between said first and second attachment means upon a second predetermined axial force occurring between said first and second attachment means, said second sealing means being force balanced relative to said first sealing means such that said second predetermined axial force is smaller than said first predetermined axial force, said second sealing means being configured and arranged to operate in series with said first sealing means.

27. A flexible slide joint comprising:

a first tube member having a first center axis;

a second tube member having a second center axis;

a slideable sealing assembly configured and arranged between said first and second tube members to accommodate a first range of axial movement between said first and second tube members upon a first predetermined axial force occurring between said first and second tube members; and an axially compressible element configured and arranged between said first and second tube members to accommodate a second range of axial movement between said first and second tube members upon a second predetermined axial force occurring between said first and second tube members, said axially compressible element and said slidable sealing assembly being configured and arranged relative to each other to operate in series such that once said axially compressible element reaches a travel limit of the second range of axial movement, said slidable sealing assembly begins to slide.

28. The flexible slide joint according to claim 27, wherein said slideable sealing assembly includes a sealing sleeve coupled to said first tube member and a sealing tube coupled to said second tube member, said sealing sleeve having an annular inner contact surface slideably contacting an outer contact surface of said sealing tube.

29. The flexible slide joint according to claim 28, wherein said axially compressible element is located at a first end of said first tube member and at a second end of said sealing sleeve such that said sealing sleeve slides axially relative to said first tube member.

30. The flexible slide joint according to claim 28, wherein said sealing tube has a resilient spherical portion that contacts said sealing sleeve to angulate said resilient sealing tube relative to said sealing sleeve.

31. The flexible slide joint according to claim 27, wherein said slideable sealing assembly is configured and arranged between said first and second tube members to accommodate angular movement between said first and second center axes upon a predetermined angular force occurring between said first and second tube members.

32. The flexible slide joint according to claim 27, wherein said axially compressible element is a removable sealing ring having a first sealing end and a second sealing end.

33. The flexible slide joint according to claim 32, wherein said sealing ring has multiple convolutions between said first sealing end and said second sealing end.

34. The flexible slide joint according to claim 33, wherein said sealing ring is configured and arranged relative said first and second tube members such that said sealing ring is arranged to be pressure energized.

\* \* \* \* \*